(12) United States Patent
Kim et al.

(10) Patent No.: US 10,425,576 B2
(45) Date of Patent: Sep. 24, 2019

(54) DRONE AND METHOD FOR CONTROLLING THE SAME

(71) Applicant: LG ELECTRONICS INC., Seoul (KR)

(72) Inventors: Minjae Kim, Seoul (KR); Hokyun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 15/386,933

(22) Filed: Dec. 21, 2016

(65) Prior Publication Data

US 2017/0339337 A1 Nov. 23, 2017

(30) Foreign Application Priority Data

May 20, 2016 (KR) ........................ 10-2016-0061970

(51) Int. Cl.
| | | |
|---|---|---|
| H04N 5/232 | (2006.01) |
| B64C 39/02 | (2006.01) |
| B64D 47/08 | (2006.01) |
| G06K 9/00 | (2006.01) |
| G06T 7/20 | (2017.01) |
| H04N 7/18 | (2006.01) |

(52) U.S. Cl.
CPC ....... *H04N 5/23216* (2013.01); *B64C 39/024* (2013.01); *B64D 47/08* (2013.01); *G06K 9/0063* (2013.01); *G06K 9/00724* (2013.01); *G06T 7/20* (2013.01); *H04N 5/232* (2013.01); *H04N 5/23206* (2013.01); *H04N 7/183* (2013.01); *B64C 2201/027* (2013.01); *B64C 2201/108* (2013.01); *B64C 2201/127* (2013.01)

(58) Field of Classification Search
CPC ...... H04N 5/23216; H04N 7/183; G06T 7/20; G06K 9/00724; G06K 9/0063; B64C 39/024; B64C 2201/108; B64C 2201/027; B64C 2201/127; B64D 47/08
USPC ........................................................ 348/144
See application file for complete search history.

(56) References Cited

U.S. PATENT DOCUMENTS

| | | | |
|---|---|---|---|
| 7,418,320 B1* | 8/2008 | Bodin ................. | G05D 1/0094 701/26 |
| 2006/0074557 A1 | 4/2006 | Mulligan et al. | |
| 2012/0098933 A1* | 4/2012 | Robinson ............. | H04N 13/221 348/46 |
| 2013/0176423 A1* | 7/2013 | Rischmuller ........ | G05D 1/0038 348/114 |
| 2013/0216144 A1* | 8/2013 | Robinson ............. | G06T 7/2006 382/233 |

(Continued)

*Primary Examiner* — Young Lee
(74) *Attorney, Agent, or Firm* — Birch, Stewart, Kolasch & Birch, LLP

(57) ABSTRACT

A drone including a flying unit configured to generate a lift force for flying; a communication unit configured to receive sensing data obtained in a mobile terminal from the mobile terminal; a camera configured to capture a specific object; and a controller configured to recognize at least one of a movement change of the specific object and a status change of the specific object based on the received sensing data, change a capturing composition of the specific object based on the recognized at least one of the movement change and the status change, and capture the specific object via the camera based on the changed capturing composition.

4 Claims, 26 Drawing Sheets

(56) References Cited

U.S. PATENT DOCUMENTS

| | | | | |
|---|---|---|---|---|
| 2014/0008496 | A1* | 1/2014 | Ye | B64C 13/20 |
| | | | | 244/190 |
| 2015/0350614 | A1* | 12/2015 | Meier | H04N 7/188 |
| | | | | 348/144 |
| 2015/0355463 | A1 | 12/2015 | Sako et al. | |
| 2015/0370250 | A1* | 12/2015 | Bachrach | G05D 1/0016 |
| | | | | 701/2 |
| 2016/0165146 | A1* | 6/2016 | Brav | H04N 5/23206 |
| | | | | 348/218.1 |

\* cited by examiner

FIG. 7
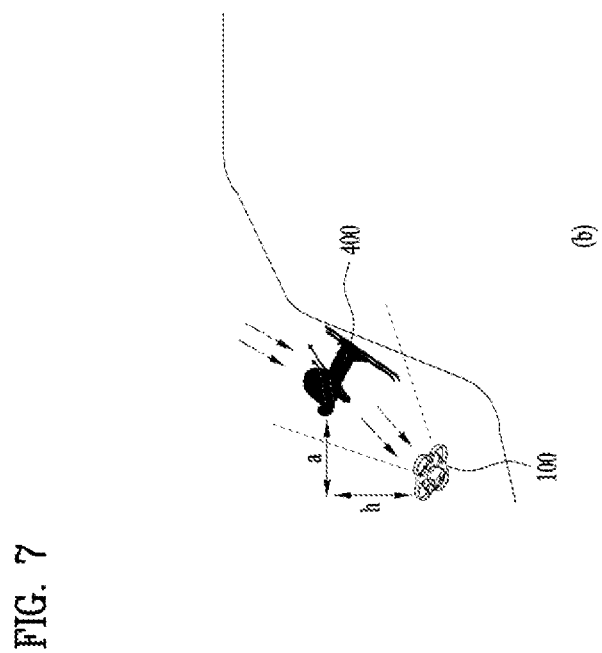
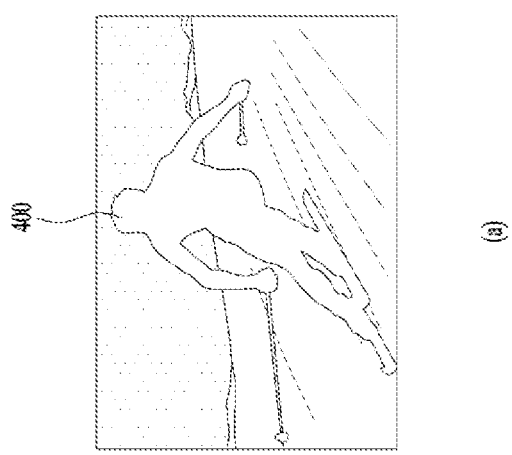

FIG. 9
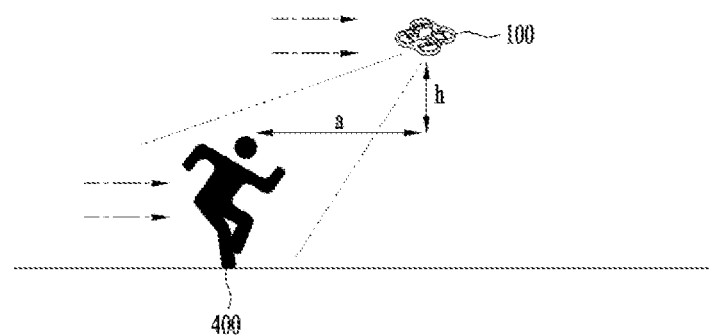
(a)
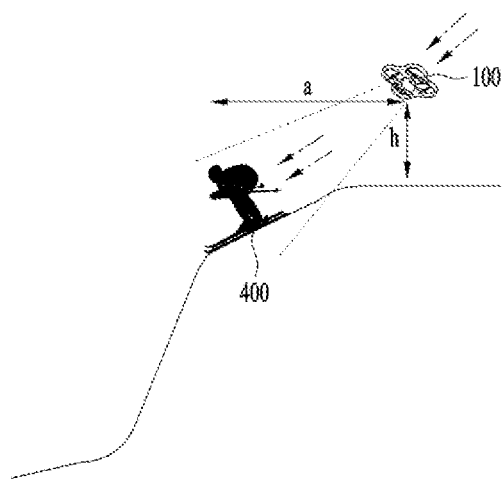
(b)

FIG. 18
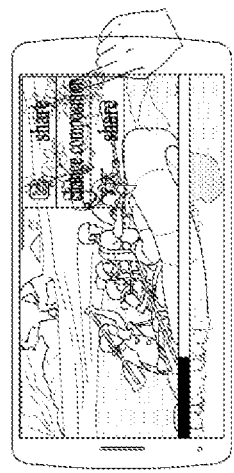
(b)
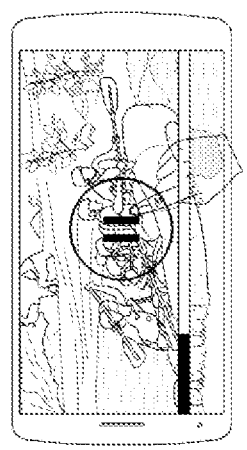
(a)
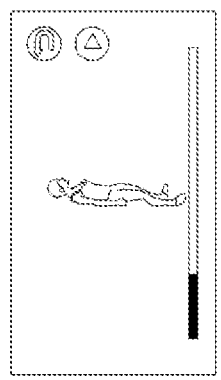
(c)

FIG. 19
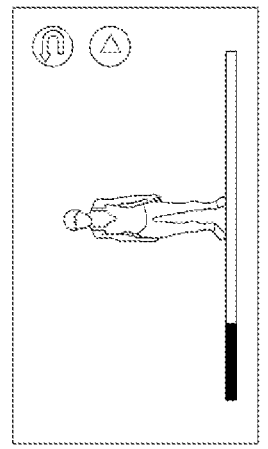
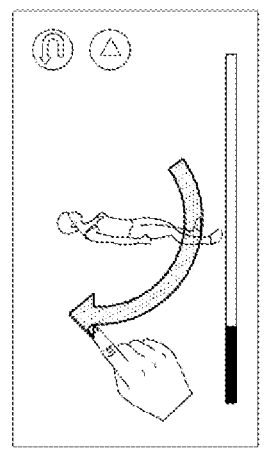

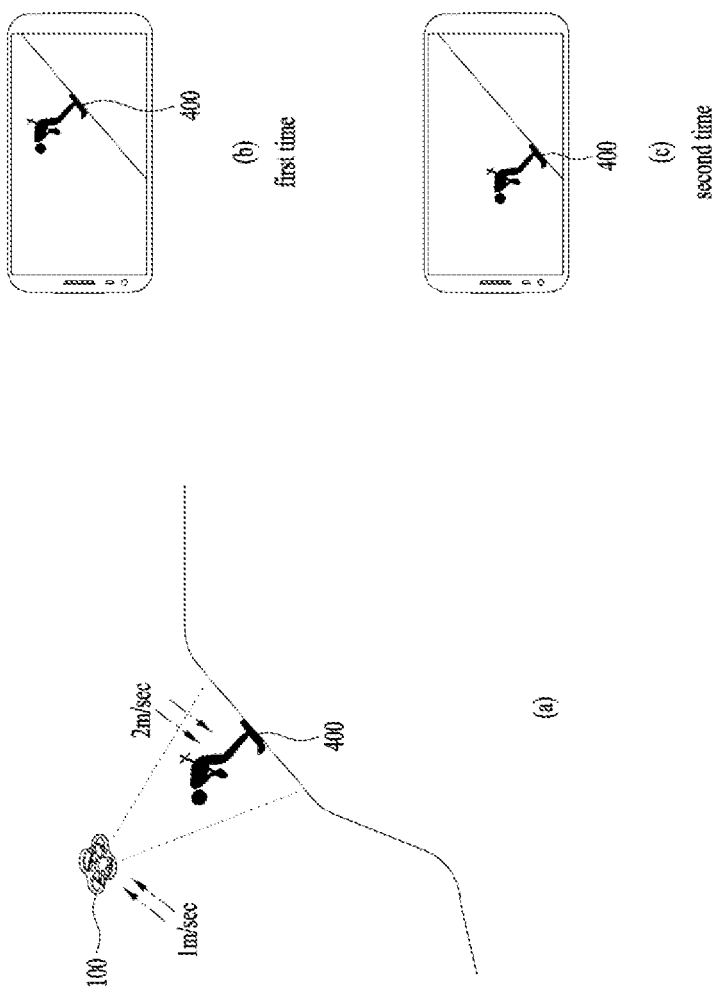

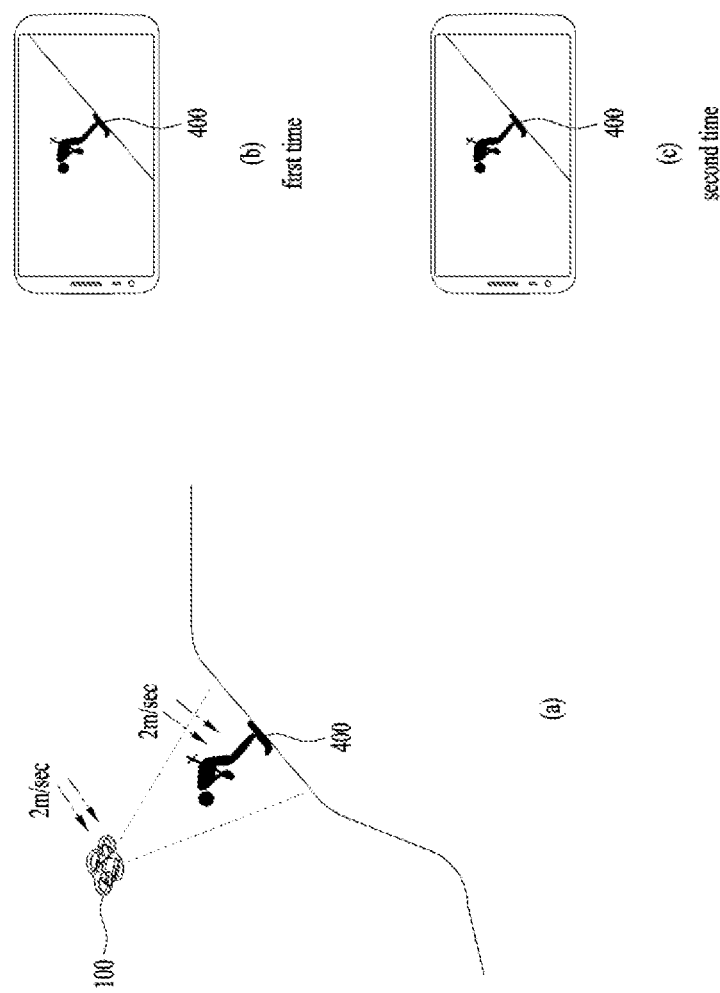

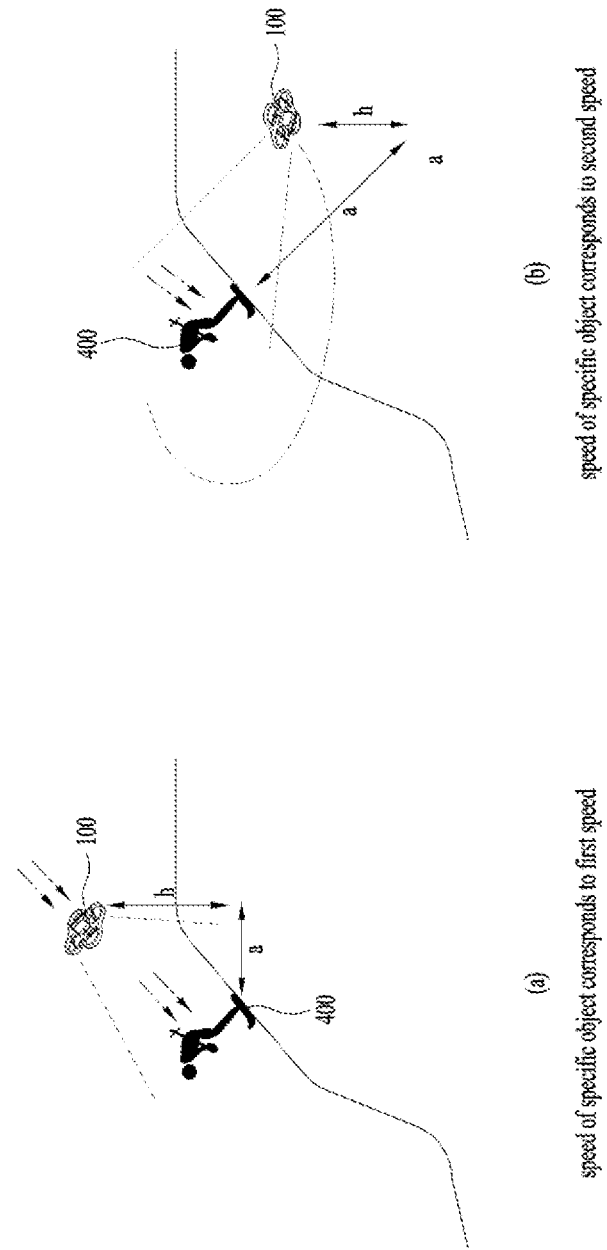

DRONE AND METHOD FOR CONTROLLING THE SAME

This application claims the benefit of the Korean Patent Application No. 10-2016-0061970, filed on May 20, 2016, which is hereby incorporated by reference as if fully set forth herein.

BACKGROUND OF THE INVENTION

Field of the Invention

The present invention relates to a drone and a method of controlling therefor.

Discussion of the Related Art

Recently, there is a drift towards having a drone capable of being manageable by an individual or a company. A drone, for example, corresponds to a flying object of such a shape as a plane or a helicopter flying by a control signal of a radio wave while not carrying a human. Recently, a case of sharing a video captured in the air using a camera embedded in the drone on the Internet is increasing and using a drone instead of a zimizib camera in a filming site is increasing.

Further, a technology of capturing a video while maintaining a space between a drone and a subject is recently developed. However, in order to capture a video while changing a capturing composition in consideration of a movement change of a subject and a status change of the subject, it is necessary to have a separate cameraman. A technology of capturing a video captured by a drone by automatically changing a capturing composition does not exist.

However, as owning a drone owned by an individual is increasing, a person tends to capture a video without a separate cameraman. Hence, the necessity for a technology of capturing a video captured by a drone by autonomously changing a capturing composition in consideration of a movement change of a subject and a status change of the subject is emerging.

SUMMARY OF THE INVENTION

Accordingly, an object of the present invention is to address the above-noted and other problems.

A technical task of one embodiment of the present invention is to make a drone capture a video while automatically changing a capturing composition in consideration of a movement change of a subject and a status change of the subject.

Another technical task of one embodiment of the present invention is to make a drone autonomously capture a video similar to a video captured by a highly skilled cameraman without a control of a separate cameraman.

Technical tasks obtainable from the present invention are non-limited by the above-mentioned technical tasks. Also, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a drone that communication is connected with a mobile terminal includes a flying unit configured to generate lift force for flying, a communication unit configured to receive sensing data obtained in the mobile terminal from the mobile terminal, a camera configured to capture a specific object, and a controller. In this instance, the controller recognizes at least one of a movement change of the specific object and a status change of the specific object based on the sensing data, changes a capturing composition of the specific object based on the at least one of the recognized movement change and the recognized status change, and captures the specific object via the camera based on the changed capturing composition.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Effects obtainable from the present invention may be non-limited by the above mentioned effect. And, other unmentioned effects can be clearly derived and understood from the following description by those having ordinary skill in the technical field to which the present invention pertains.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 5 to 8 are diagrams illustrating an example of a method of changing a capturing composition of a drone based on at least one of a movement change and a status change of a specific object according to one embodiment of the present invention;

FIG. 9 is a diagram illustrating an example of a method of changing a capturing composition according to a type of activity of a specific object in a drone according to one embodiment of the present invention;

FIGS. 18 to 21 are diagrams illustrating an example of a method of capturing a video by a drone by changing a capturing composition of a video stored in a memory of a mobile terminal;

FIG. 24 is a diagram illustrating a different example of a method of recognizing a speed of a specific object in a drone according to one embodiment of the present invention;

FIG. 25 is a diagram illustrating a further different example of a method of recognizing a speed of a specific object in a drone according to one embodiment of the present invention;

FIG. 26 is a diagram illustrating an example of a method of changing a capturing composition of a specific object based on a speed of the specific object in a drone according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein for controlling a drone may be implemented using a variety of different types of terminals. Examples of such terminals include cellular phones, smartphones, terminals for controlling a drone, slate PCs, tablet PCs, ultra books, wearable devices (for example, smart watches, smart glasses, head mounted displays (HMDs)), and the like.

Figure 1:
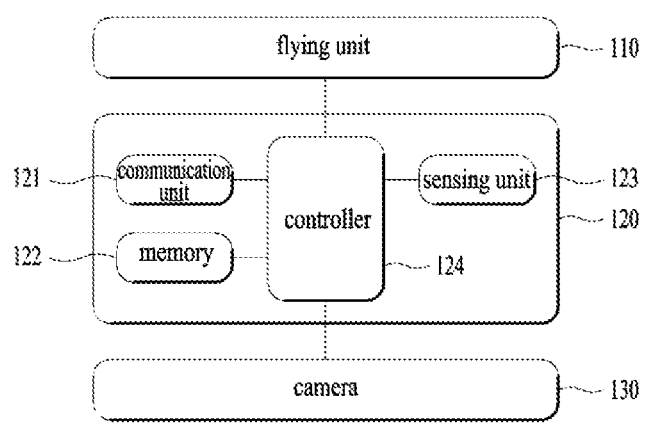
FIG. 1 is a block diagram illustrating a drone according to an embodiment of the present invention.

FIG. 1 is a block diagram illustrating a drone according to an embodiment of the present invention. A drone 100 can include a flying unit 110, a body unit 120, a camera 130, and the like. Since configuration elements shown in FIG. 1 are not essential for implementing the drone, the drone described in the present specification may include configuration elements more or less than the configuration elements listed above.

More specifically, the flying part 110 among the configuration elements can generate lift force by rotating a propeller and can control a size of the lift force by controlling number of rotation of the propeller. An altitude, a moving speed, and the like of the drone 100 can be controlled by controlling the size of the lift force.

Consequently, the flying unit 110 can control flying of the drone under the control of a controller 124. The body unit 120 can include electronic parts constructing the drone 100. For example, a communication unit 121, a memory 122, a sensing unit 123, and the controller 124 can be included in the body unit 120. The communication unit 121 can include one or more modules that enables wireless communication to be performed between the drone 100 and a terminal (e.g., a mobile terminal, etc.) for controlling the drone.

The communication unit 121 can transceive a radio signal with a terminal for controlling the drone in a communication network according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The communication unit 121 can transceive data with a terminal for controlling a drone according to at least one wireless Internet technology in a range including Internet technology not included in the list above.

In addition, the communication unit 121 can support short-range communications using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), and Wi-Fi Direct, Wireless USB (Wireless Universal Serial Bus). The communication unit 121 can support wireless communication between a terminal for controlling the drone and the drone 100 via a short-distance wireless communication network (Wireless Area Network).

Meanwhile, a location information module can be embedded in the communication unit 121. The location information module corresponds to a module for obtaining a location (or a current location) of a drone. As a representative example for the location information module, there is a GPS (Global Positioning System) module or a Wi-Fi (Wireless Fidelity) module. For example, in case of using the GPS module, the drone 100 can obtain a location of the drone 100 using a signal transmitted from a GPS satellite. As a different example, in case of using the Wi-Fi module, the drone 100 can obtain a location of the drone 100 based on information of a wireless AP (access point) configured to transmit and receive a radio signal with the Wi-Fi module. If necessary, the location information module can alternately or additionally perform a function of a different module of the communication unit 121 to obtain data on the location of the drone 100. The location information module corresponds to a module for obtaining a location (or a current location) of the drone. The location information module may be non-limited by a module directly calculating or obtaining a location of the drone.

The communication unit 121 can receive a control signal for controlling flying of the drone, a control signal for controlling the camera 130, and the like from a terminal that controls the drone 100. And, the communication unit 121 can transmit various sensed data detected by the drone, videos captured via the camera 130, and the like to the terminal that controls the drone.

Also, the memory 122 can store data supporting various functions to the drone 100. The memory 122 can store a plurality of application programs operated in the drone 100, data for flying of the drone 100, data used for capturing a video, and commands. At least one of a plurality of the application programs may exist in the drone 100 from the time of manufacturing the drone 100. The application program is stored in the memory 122 and the controller 124 can control the drone to capture a video while flying. The memory 122 stores a video data captured by the camera 130 and can perform a role in storing data received from a terminal for controlling the drone 100.

The sensing unit 123 plays a role in detecting a status and surrounding environment of the drone 100. As an example, the sensing unit 123 can prevent the drone 100 from being collided with a different object by sensing a surrounding object. And, the sensing unit 123 can detect a current altitude and a current speed of the drone based on a detection signal.

Besides the operation related to the application program, the controller 124 controls overall operation of the drone 100 in general. The controller 124 enables the drone to capture a video while flying along with a flying path by processing a signal, data, information input or output via the aforementioned configuration elements or executing the application program stored in the memory 122.

The controller 124 can control at least a part of the configuration elements mentioned earlier with reference to FIG. 1 to execute the application program stored in the memory 122. Moreover, the controller 124 can combine at least two or more configuration elements with each other among the configuration elements included in the drone 100 to execute the application program.

Meanwhile, the body unit 120 can include a power supply unit. Power is provided to the drone 100 from the power supply unit under the control of the controller 124 and the drone supplies power to each of the configuration elements. The power supply unit includes a battery and the battery may correspond to an embedded battery or a replaceable battery.

The drone 100 can include one or a plurality of cameras 130. In particular, the camera 130 can play a role in capturing a video or a still image by being exposed to the outside of the drone 100. If a video is captured by the camera 130, the controller 124 can transmit the captured video data to a terminal for controlling the drone.

The camera 130 capable of being tilted in up and down direction or left to right direction can be installed to capture a subject. The controller 124 can make a subject to be continuously captured in a video by controlling a movement of the camera 130.

In addition, a plurality of cameras 130 mounted on the drone 100 can be arranged in a matrix structure. Information on a plurality of videos having various angles or focuses can be input into the drone 100 via the cameras 130 of the matrix structure. In addition, a plurality of the cameras 130 can also be arranged in a stereo structure to obtain a left image and a right image for implementing a 3D image.

The camera 130 can include a plurality of lenses which are arrayed along with at least one line. A plurality of the lenses can also be arrayed in a matrix form. This type of camera can be referred to as 'array camera'. If the camera 130 is configured by the array camera, it can capture a video in various ways using a plurality of the lenses and can obtain a video of higher quality.

Figure 2:
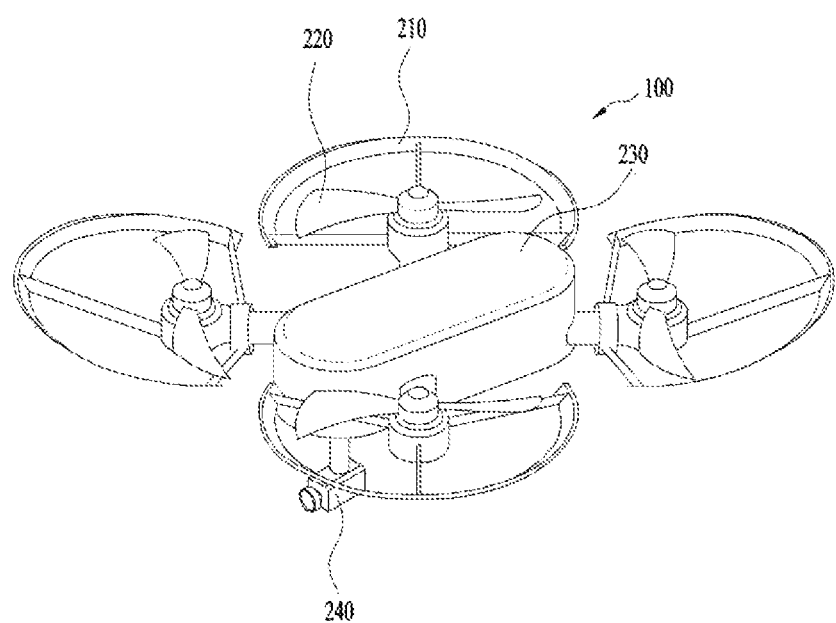
FIG. 2 is a diagram illustrating an example of an exterior of a drone according to one embodiment of the present invention.

Next, FIG. 2 is a diagram illustrating an example of an exterior of a drone according to one embodiment of the present invention. Referring to FIG. 2, the drone 100 can include a propeller guard 210, a propeller 220, a body unit 230, a camera 240, and the like. However, the scope of right of the present invention is not restricted by a shape of the drone 200 shown in FIG. 2. In particular, the present invention can be applied to various drones of a helicopter shape or various drones of a plane shape such as a tricopter using 3 propellers, a quadcopter shown in FIG. 2 using 4 propellers, an octocopter using 8 propellers, and the like.

The propeller guard 210 corresponds to a configuration for preventing a human or an animal from being hurt by the operation of the propeller 220. The propeller guard can be omitted. The propeller 220 and the camera 240 operate in response to a control signal of the body unit 230 and the body unit 230 includes a communication unit capable of communicating with a terminal for controlling the drone 100.

The camera 240 can be configured by at least one or more cameras and the camera can be configured to be tilted in up/down and left/right direction. Hence, the camera 240 may move in response to a control signal of the body unit 230. Depending on an embodiment, the camera 240 may move according to a separate control signal different from the control signal of the body unit 230.

In the following, embodiments, which are associated with a control method capable of being implemented in the aforementioned drone, are explained with reference to the attached drawings. It is apparent to those skilled in the art that the present invention can be modified into a specific form in a range not deviating from the idea of the present invention and the essential characteristics of the present invention.

Figure 3:
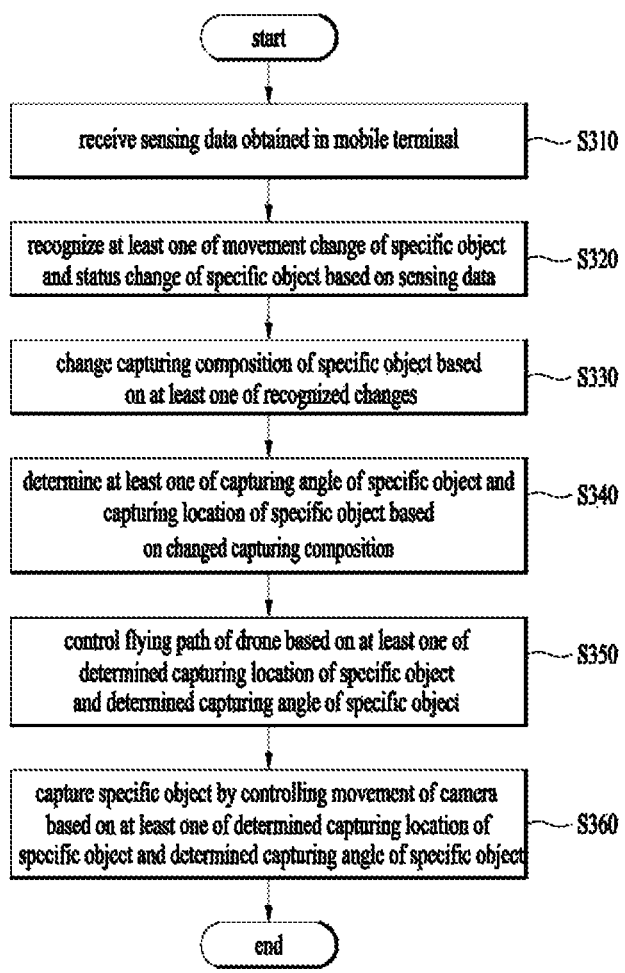
FIG. 3 is a flowchart illustrating a method of capturing a specific object according to a movement change of a specific object and a status change of the specific object in a drone according to one embodiment of the present invention.

FIG. 3 is a flowchart illustrating a method of capturing a specific object according to a movement change of a specific object and a status change of the specific object in a drone according to one embodiment of the present invention. According to one embodiment of the present invention, the controller 124 of the drone 100 can control the communication unit 121 to communicate with a mobile terminal for controlling the drone. In this instance, the mobile terminal for controlling the drone may correspond to one of a mobile phone, a smartphone, a specific external terminal for controlling the drone, and a watch-type mobile terminal.

If a signal for capturing a specific object in a specific capturing mode is received from the mobile terminal, the controller 124 of the drone 100 can control the camera 130 to capture the specific object. In this instance, the specific capturing mode may correspond to a capturing mode of changing a capturing composition according to a movement change of the specific object and a status change of the specific object while maintaining a distance from the specific object as much as a predetermined distance and continuously capturing the specific object.

The specific object may correspond to a user of a mobile terminal. Specifically, since the drone 100 captures the mobile terminal by being apart from the mobile terminal as much as a predetermined distance, the user of the mobile terminal is captured. Hence, the user of the mobile terminal may become the specific object.

The controller 124 can control the flying unit 110 to fly while tracking the specific object in the specific capturing mode and can control a movement of the camera 130 to make the specific object to be continuously captured. Further, the controller 124 can control the communication unit 121 to receive sensing data obtained from the mobile terminal with which the communication is connected (S310).

The sensing data corresponds to sensing data obtained via a sensor of the mobile terminal. The sensing data can include at least one of information on a moving direction of the mobile terminal, information on a moving speed of the mobile terminal, information on a location of the mobile terminal, information on an altitude of the mobile terminal, information on a gesture of a specific object, information on a pulse of a specific object, information on respiration of a specific object, information on a body temperature of a specific object, and information on an amount of perspiration of a specific object.

The information on the moving direction of the mobile terminal can include information on a moving direction obtained by a gyro sensor or the like included in the mobile terminal, information on a change of the moving direction, and the like. The information on the moving speed of the mobile terminal can include information on a moving speed obtained by a speed measurement sensor included in the mobile terminal, information on acceleration obtained by an acceleration sensor included in the mobile terminal, and the like.

The information on the location of the mobile terminal can include information on a current location of the mobile terminal obtained by a location information module of the mobile terminal, information on a location change of the mobile terminal, and the like. The information on the altitude of the mobile terminal can include information on an altitude obtained by an altitude measurement sensor included in the mobile terminal, information on an altitude change of the mobile terminal, and the like.

The information on the gesture of the specific object can include information on a user gesture obtained by a motion detection sensor included in the mobile terminal, information on a gesture change according to a movement of a user of the mobile terminal, and the like. The information on the pulse of the specific object can include information on a pulse pattern of a user of the mobile terminal measured by a PPG (PhotoPlethysmoGraphy) sensor included in the mobile terminal, information on a pulse change of a user, and the like.

The information on the respiration of the specific object can include information on a respiration pattern of a user of a mobile terminal obtained by a sensor included in the mobile terminal, information on a respiration change of the user of the mobile terminal, and the like. The information on the body temperature of the specific object can include information on a current body temperature of a user of a mobile terminal obtained by a sensor included in the mobile terminal, information on a change of a body temperature of the user of the mobile terminal, and the like. The information on the amount of the perspiration of the specific object can include information on an amount of perspiration of a user of a mobile terminal obtained by a sensor included in the mobile terminal, information on a change of the amount of the perspiration of the user of the mobile terminal, and the like.

The controller 124 can recognize at least one of a movement change of a specific object and a status change of the specific object based on the received sensing data (S320). The movement change of the specific object may correspond to a movement change of the mobile terminal connected with the drone.

Specifically, the controller 124 can recognize the movement change of the mobile terminal based on at least one of the information on the moving direction of the mobile terminal, the information on the moving speed of the mobile terminal, the information on the acceleration of the mobile terminal, the information on the location of the mobile terminal, and the information on the altitude of the mobile terminal included in the received sensing data. The controller 124 can recognize the movement change of the mobile terminal as a movement change of the specific object.

The status change of the specific object may correspond to a change of an excited state of a user of a mobile terminal connected with the drone. In this instance, the excited state corresponds to a state which is measured according to changes of respiration, a body temperature, an amount of perspiration, and a purse of the user of the mobile terminal.

Specifically, the controller 124 can recognize the change of the excited state of the user of the mobile terminal using at least one of information on a gesture of the specific object, information on a pulse of the specific object, information on respiration of the specific object, information on a body temperature of the specific object, and information on an amount of perspiration of the specific object included in the received sensing data. The controller 124 can recognize the change of the excited state as a state change of the specific object.

As an example, if the controller 124 recognizes such information indicating that the pulse of the user of the mobile terminal is rapidly increased and the body temperature of the user rises via the received sensing data, the controller 124 can know that the state of the specific object is changed to the excited state.

As a different example, if the controller 124 recognizes such information indicating that the pulse of the user of the mobile terminal becomes slower, the body temperature of the user goes down, and the respiration is stabilized via the received sensing data, the controller 124 can know that the state of the specific object is changed to the stable state.

Depending on an embodiment, the controller 124 can recognize at least one of the extent of the movement change of the specific object and the extent of the status change of the specific object using the received sensing data. As an example, the controller 124 can recognize the extent of the movement change of the mobile terminal using the information on the altitude of the mobile terminal, the information on the location of the mobile terminal, and the like included in the received sensing data. The controller 124 can recognize the extent of the movement change of the specific object using the extent of the movement change of the mobile terminal.

As a different example, the controller 124 can recognize the extent of excitement of the specific object using at least one of the information on the pulse of the specific object, the information on the respiration of the specific object, the information on the amount of the perspiration of the specific object, and the information on the body temperature of the specific object included in the received sensing data. The can recognize the extent of the status change of the specific object based on the recognized extent of the excitement. In particular, the extent of the excitement can be recognized based on at least one of the pulse, the amount of perspiration, the body temperature, and the respiration of a person that changes according to the extent of the excitement. The extent of the status change of the specific object can be recognized using the recognized extent of the excitement.

The controller 124 can change a capturing composition of the specific object based on at least one of the recognized changes (S330). In this instance, the capturing composition of the specific object can be changed using at least one of the extent of the movement change of the specific object and the extent of the status change of the specific object.

As an example, if it is recognized as there is no movement change of the specific object and the status of the specific object is stable, the controller 124 can set the capturing composition of the specific object to a first capturing composition (for example, a capturing composition that captures a face only of the specific object at close range).

As a different example, if it is recognized as the movement of the specific object is changing little bit and the status of the specific object is changed to a first excited state (for example, a little excited state), the controller 124 can set the capturing composition of the specific object to a second capturing composition (for example, a capturing composition that captures the specific object at a position apart from the specific object as much as a predetermined distance).

As a further different example, if it is recognized as the movement of the specific object is changing a lot and the status of the specific object is changed to a second excited state (for example, a very excited state), the controller 124 can set the capturing composition of the specific object to a third capturing composition (for example, a capturing composition that captures the specific object at the front).

Information on a capturing composition which is mapped to the extent of each change can be stored in the memory 122 in advance. Depending on an embodiment, the controller 124 can recognize a type of a current activity of a specific object and also change a capturing composition of the specific object based on the recognized movement change, the recognized status change and the recognized type of the current activity of the specific object. In this instance, the type of the activity can include such a sport activity as skiing, running, and baseball and a general activity such as travelling.

As an example, if the current activity of the specific object is recognized as skiing, the controller 124 can change the capturing composition to mainly capture a ski track based on a movement change of the specific object and a status change of the specific object. As a different example, if the current activity of the specific object is recognized as baseball, the controller 124 can change the capturing composition to capture a baseball as well as the specific object.

In another example, if the current activity of the specific object is recognized as an activity of cruising in a yacht, the controller 124 can change the capturing composition to capture surroundings as well as the specific object. In another example, if the current activity of the specific object is recognized as running, the controller 124 can change the capturing composition to mainly capture a running track based on a movement change of the specific object and a status change of the specific object. In another example, if the current activity of the specific object is recognized as travelling, the controller 124 can change the capturing composition to mainly capture a background while tracking the movement of the specific object.

A method of recognizing a type of a current activity of the specific object is explained in the following. The type of the current activity of the specific object can be recognized based on at least one of the movement change of the specific object and the status change of the specific object or can be recognized by transmitting information on a type of an activity selected from the mobile terminal to a drone.

Depending on an embodiment, timing of starting capturing and timing of finishing capturing may vary depending on the type of the activity. As an example, if a type of the current activity of the specific object is recognized as skiing, the controller 124 receives map information of a skiing track and can then start and finish capturing a video based on the received map information, a movement change of the specific object, and a status change of the specific object.

As a different example, if type of the current activity of the specific object is recognized as baseball, the controller 124 can start and finish capturing a video by receiving a capturing start command or a capturing end command from a mobile terminal. In another example, if the type of the current activity of the specific object is recognized as an activity of cruising in a yacht, the controller 124 can start and finish capturing a video based on the extent of a movement change of the specific object. In particular, if the extent of the movement of the specific object is high, the controller 124 starts capturing a video. If the extent of the movement of the specific object is low, the controller 124 can finish capturing a video.

In another example, if the type of the current activity of the specific object is recognized as running, the controller 124 can start and finish capturing a video based on a movement change of the specific object and a status change of the specific object.

In still another example, if the type of the current activity of the specific object is recognized as travelling, the controller 124 can start and finish capturing a video by receiving a capturing start command or a capturing end command from a mobile terminal. Depending on an embodiment, the controller 124 recognizes surrounding geographic information of the specific object and can then change a capturing composition of the specific object based on the recognized surrounding geographic information. In this instance, the controller 124 can change the capturing composition in consideration of at least one of the status change of the specific object and the movement change of the specific object.

The surrounding geographic information can include information on a slope near the specific object, information on a barrier existing near the specific object, and the like, by which the present invention may be non-limited. The surrounding geographic information can also include information on a famous building existing near the specific object, information on a famous tourist attraction existing near the specific object, and the like.

The controller 124 can receive the surrounding geographic information from a mobile terminal or can recognize the information by analyzing a video obtained by the camera 130. For example, if the controller 124 recognizes the information on the famous tourist attraction existing near the specific object, the controller 124 can change a capturing composition to capture the famous tourist attraction together with the specific object based on the recognized information. In this instance, if it is recognized as the state of the specific object is changed to an excited state and there is no movement of the specific object, the controller 124 recognizes it as the specific object is looking at the tourist attraction. Hence, the controller 124 can change the capturing composition to mainly capture the tourist attraction rather than the specific object.

Further, the controller 124 can determine at least one of a capturing angle of the specific object and a capturing position of the specific object based on the capturing composition changed in the step S330 (S340). The capturing angle may correspond to an angle of capturing the specific object in the air. In this instance, the capturing angle may correspond to an angle which is changed by changing a flying path of the drone, an altitude of the drone, a movement of the camera 130, or the like.

For example, when it is assumed that the specific object does not move, if the specific object is continuously captured via the camera 130 while changing the altitude of the drone, the capturing angle of the specific object is changed. Consequently, if the capturing angle is determined, it can determine the flying path of the drone, the altitude of the drone, and the movement of the camera 130.

The capturing position of the specific object corresponds to a position at which the specific object is captured. The capturing position may correspond to the front, the rear, the right, or the left of the specific object. As an example, if the capturing position of the specific object corresponds to the rear of the specific object, the drone can capture the specific object while tracking the specific object at the back of the specific object.

As a different example, if the capturing position of the specific object corresponds to the right of the specific object, the drone can capture the specific object while flying in the right side of the specific object with speed identical to speed of the specific object. A capturing position and a capturing angle respectively corresponding to a capturing composition can be stored in the memory 122 in advance.

The controller 124 can control the flying unit 110 to make the drone fly based on at least one of the determined capturing position of the specific object and the determined capturing angle of the specific object (S350). An algorithm for setting a flying path of the drone using the capturing position of the specific object and the capturing angle of the specific object can be stored in the memory 122 in advance.

The controller 124 can capture the specific object by controlling a movement of the camera 130 based on at least one of the determined capturing position of the specific object and the determined capturing angle of the specific object (S360). An algorithm for setting the movement of the camera 130 using the capturing position of the specific object and the capturing angle of the specific object can be stored in the memory 122 in advance.

Consequently, the capturing composition for capturing the specific object is changed based on the movement change of the specific object and the status change of the specific object. The flying path of the drone 100 and the movement of the camera are determined according to the changed capturing composition.

According to one embodiment of the present invention, the controller 124 can control the communication unit 121 to transmit a video including the specific object, which is captured via the changed capturing composition, to the mobile terminal with which the communication is connected. According to the present embodiment, it can capture a video of various compositions using a drone although there is no person that controls the drone.

Figure 4:
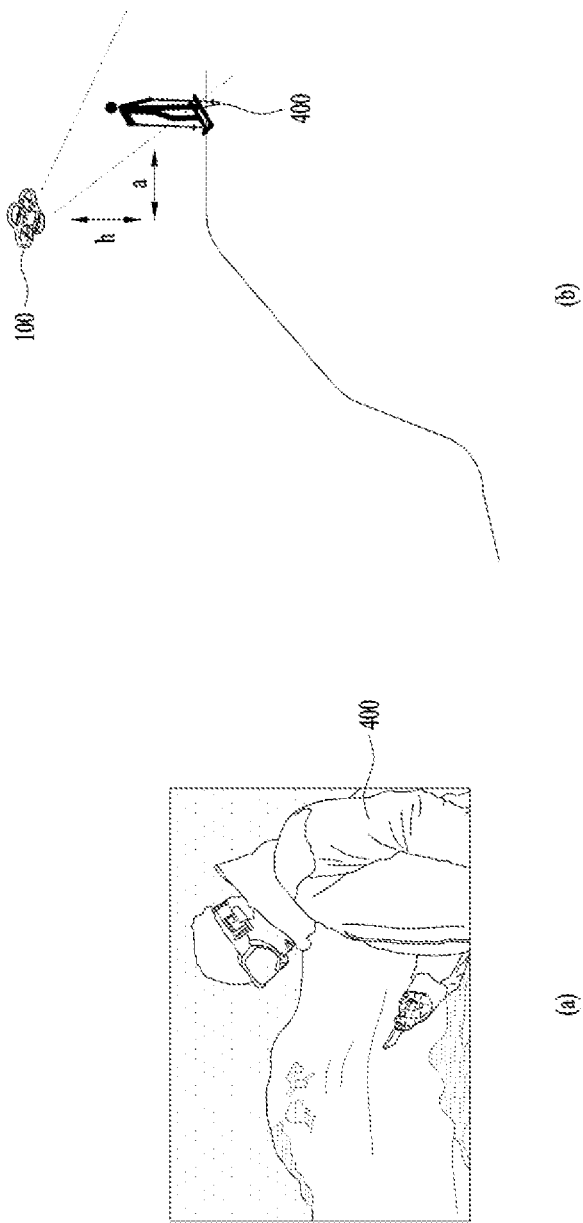
FIG. 4 is a diagram illustrating an example of a method of capturing a specific object in a drone according to one embodiment of the present invention when a movement change and a status change of the specific object do not exist.

Next, FIG. 4 is a diagram illustrating an example of a method of capturing a specific object in a drone according to one embodiment of the present invention when a movement change and a status change of the specific object do not exist.

According to one embodiment of the present invention, the controller 124 can control the communication unit 121 to receive sensing data obtained by a mobile terminal from the mobile terminal. In this instance, the sensing data can include at least one of information on a moving direction of the mobile terminal, information on a speed of the mobile terminal, information on a location of the mobile terminal, information on an altitude of the mobile terminal, information on a gesture of a specific object, information on a pulse of the specific object, information on respiration of the specific object, information on body temperature of the specific object, and information on an amount of perspiration of the specific object.

Depending on an embodiment, the controller 124 can recognize a type of a current activity of the specific object. In FIG. 4, for clarity, assume that the type of the current activity of the specific object corresponds to an activity of skiing. Referring to FIGS. 4 (a) and (b), if the controller 124 recognizes that there is no movement change and status change of the specific object 400 based on the received sensing data, the controller 124 can capture the specific object 400 with a first capturing composition.

First, when there is no movement change of the specific object 400 is explained in the following. If it is recognized that there is no change in a moving direction based on information on the moving direction of the mobile terminal included in the received sensing data, the controller 124 can recognize it as there is no movement change of the specific object 400.

If a speed is not recognized based on the information on the speed of the mobile terminal included in the received sensing data, the controller 124 can recognize it as there is no movement change of the specific object 400. If a location change is not recognized based on the information on the location of the mobile terminal included in the received sensing data, the controller 124 can recognize it as there is no movement change of the specific object 400. If it is recognized that there is no change in an altitude based on the information on the altitude of the mobile terminal included in the received sensing data, the controller 124 can recognize it as there is no movement change of the specific object 400.

However, if at least one case opposite to the aforementioned cases is recognized, the controller 124 can recognize it as there is a movement change of the specific object 400. In the following, when there is no status change of the specific object 400 is explained.

If it is recognized that a gesture of the specific object 400 corresponds to a gesture belonging to a gesture of a predetermined level (e.g., such a simple gesture as a gesture of waving a hand, a gesture of warming up, and the like) based on the information on the gesture of the specific object 400 included in the received sensing data, the controller 124 can recognize it as there is no status change of the specific object 400.

If it is recognized that a current pulse rate of the specific object 400 corresponds to an average pulse rate based on the information on the pulse of the specific object 400 included in the received sensing data, the controller 124 can recognize it as there is no status change of the specific object 400. If it is recognized that a current respiration pattern of the specific object 400 corresponds to an usual respiration pattern based on the information on the respiration of the specific object 400 included in the received sensing data, the controller 124 can recognize it as there is no status change of the specific object 400.

If it is recognized that a current amount of perspiration of the specific object 400 corresponds to an usual amount of perspiration based on the information on the amount of perspiration of the specific object 400 included in the received sensing data, the controller 124 can recognize it as there is no status change of the specific object 400. However, if at least one case opposite to the aforementioned cases is recognized, the controller 124 can recognize it as there is a status change of the specific object 400.

Meanwhile, referring to FIG. 4 (*a*), the first capturing composition may correspond to a capturing composition for capturing the specific object 400 (e.g., upper body of a user of a mobile terminal) together with background. The controller 124 can determine at least one of a capturing angle of the specific object 400 and a capturing position of the specific object 400 based on the first capturing composition.

Specifically, referring to FIG. 4 (*b*), in order to capture the specific object 400 with a capturing composition shown in FIG. 4 (*a*), the controller 124 can control the flying unit 110 to make the drone 100 fly at a location apart from the specific object as much as a predetermined distance (a) and the location apart from the specific object as high as a predetermined altitude (h).

The first capturing composition may be non-limited by the aforementioned contents. The first capturing composition may correspond to a composition for mainly capturing the background. In this instance, the controller 124 configures a flying path of the drone and can control the flying unit 110 to make the drone fly over the specific object 400. And, while the drone is flying over the flying path and the camera captures the background only, the controller 124 may control the movement of the camera 130 to capture the specific object 400 from time to time.

Next, FIGS. 5 to 8 are diagrams illustrating an example of a method of changing a capturing composition of a drone based on at least one of a movement change and a status change of a specific object according to one embodiment of the present invention.

According to one embodiment of the present invention, the controller 124 can control the communication unit 121 to receive sensing data obtained by a mobile terminal from the mobile terminal. In this instance, the sensing data can include at least one of information on a moving direction of the mobile terminal, information on a speed of the mobile terminal, information on a location of the mobile terminal, information on an altitude of the mobile terminal, information on a gesture of a specific object, information on a pulse of the specific object, information on respiration of the specific object, information on body temperature of the specific object, and information on an amount of perspiration of the specific object.

Depending on an embodiment, the controller 124 can recognize a type of a current activity of the specific object.

In FIGS. 5 to 8, for clarity, assume that the type of the current activity of the specific object corresponds to an activity of skiing. Referring to FIGS. 5 to 8, if at least one of the movement change of the specific object 400 and the status change of the specific object is detected based on the received sensing data, the controller 124 can change a capturing composition.

First, recognizing the movement change of the specific object 400 is explained in the following. If it is recognized that there is a change in a moving direction based on information on the moving direction of the mobile terminal included in the received sensing data, the controller 124 can recognize it as there is a movement change of the specific object 400.

If a speed is recognized based on the information on the speed of the mobile terminal included in the received sensing data, the controller 124 can recognize it as there is a movement change of the specific object 400. If a location change is recognized based on the information on the location of the mobile terminal included in the received sensing data, the controller 124 can recognize it as there is a movement change of the specific object 400.

If it is recognized that there is a change in an altitude based on the information on the altitude of the mobile terminal included in the received sensing data, the controller 124 can recognize it as there is a movement change of the specific object 400. Consequently, if at least one of the aforementioned cases is recognized, the controller 124 can recognize it as there is a change in a movement of the specific object 400.

In the following, recognizing a status change of the specific object 400 is explained. If it is recognized that a gesture of the specific object 400 corresponds to a specific gesture (e.g., a gesture of skiing) based on the information on the gesture of the specific object 400 included in the received sensing data, the controller 124 can recognize it as there is a status change of the specific object 400.

If it is recognized that a current pulse rate of the specific object 400 has increased compared to an average pulse rate based on the information on the pulse of the specific object 400 included in the received sensing data, the controller 124 can recognize it as there is a status change of the specific object 400. If it is recognized that a current respiration pattern of the specific object 400 becomes faster than a usual respiration pattern based on the information on the respiration of the specific object 400 included in the received sensing data, the controller 124 can recognize it as there is a status change of the specific object 400.

If it is recognized that a current amount of perspiration of the specific object 400 has increased compared to an usual amount of perspiration based on the information on the amount of perspiration of the specific object 400 included in the received sensing data, the controller 124 can recognize it as there is a status change of the specific object 400. Consequently, if at least one of the aforementioned cases is recognized, the controller 124 can recognize it as there is a change in a status of the specific object 400.

If at least one of the movement change of the specific object 400 and the status change of the specific object 400 is detected based on the received sensing data, the controller 124 can change a capturing composition into a second capturing composition.

Figure 5:
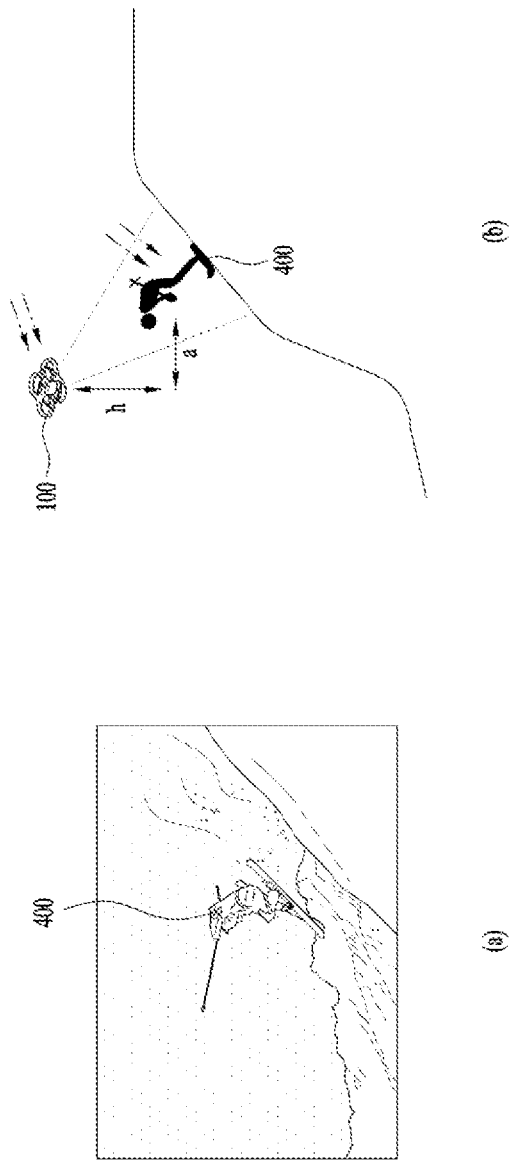

Referring to FIG. 5 (*a*), the second capturing composition may correspond to a capturing composition for capturing the entire body of the specific object 400 (e.g., a user of a mobile terminal) in the flank of the specific object 400. The controller 124 can determine at least one of a capturing angle of the specific object 400 and a capturing position of the specific object 400 based on the second capturing composition.

Specifically, referring to FIG. 5 (*b*), in order to capture the specific object 400 with a capturing composition shown in FIG. 5 (*a*), the controller 124 can control the flying unit 110 to make the drone 100 maintain a location apart from the specific object as much as a predetermined distance (a) and a predetermined altitude (h) and fly in a direction corresponding to a moving direction of the specific object 400 with a speed corresponding to a moving speed of the specific object 400. In order to capture the specific object 400 with the capturing composition shown in FIG. 5 (*a*), the controller 124 can change a capturing angle of the camera 130 by controlling the movement of the camera 130.

However, the second capturing composition may be non-limited by the aforementioned contents. The second capturing composition may correspond to a different capturing composition. As an example, the second capturing composition may correspond to a capturing composition for capturing the entire body of the specific object 400 at the back of the specific object 400.

Figure 6:
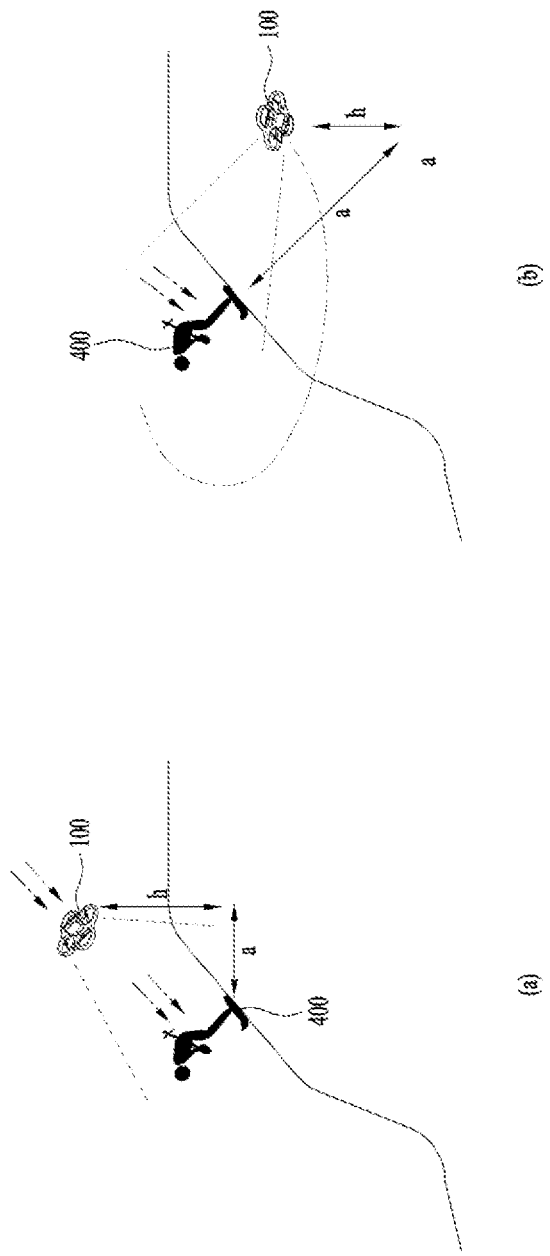

In this instance, referring to FIG. 6 (*a*), the controller 124 can control the flying unit 110 to make the drone 100 maintain a location apart from the specific object as much as a predetermined distance (a) and a predetermined altitude (h) and fly in a direction corresponding to a moving direction of the specific object 400 with a speed corresponding to a moving speed of the specific object 400 at the back of the specific object 400. And, in order to continuously capture the specific object 400, the controller 124 can change a capturing angle of the camera 130 by controlling the movement of the camera 130.

As a different example, the second capturing composition may correspond to a capturing composition for capturing the entire body of the specific object 400 while flying around over the specific object 400. In this instance, referring to FIG. 6 (*b*), the controller 124 can control the flying unit 110 to make the drone 100 maintain a location apart from the specific object as much as a predetermined distance (a) and a predetermined altitude (h) and fly around over the specific object 400. And, in order to continuously capture the specific object 400 although a location of the drone 100 is changed, the controller 124 can control the movement of the camera 130.

The aforementioned example of the second capturing composition is just an example only. The second capturing composition may correspond to a capturing composition different from the aforementioned capturing compositions. Depending on an embodiment, a capturing composition of the specific object 400 can be changed based on at least one of the extent of a movement change of the specific object 400 and the extent of a status change of the specific object 400.

Specifically, if a speed of the specific object 400 is equal to or less than a predetermined speed and the extent of an altitude change of the specific object 400 is equal to or less than the predetermined extent, the controller 124 can recognize the extent of the movement change of the specific object 400 as the first extent. The controller 180 can recognize whether or not the status change of the specific object 400 corresponds to the second extent using information on whether or not a gesture of the specific object 400 corresponds to a gesture of skiing with a speed equal to or less than a predetermined speed, information on whether or not a pulse of the specific object 400 deviates from an average pulse as much as a predetermined range, information on whether or not respiration of the specific object 400 changes as much as a predetermined range compared to a usual respiration pattern, and information on whether or not body temperature and an amount of perspiration of the specific object 400 deviate from average body temperature and a usual amount of perspiration as much as a predetermined extent.

If it is recognized that the movement change of the specific object 400 corresponds to the first extent and the status change of the specific object 400 corresponds to the second extent based on the received sensing data, the controller 124 can change a capturing composition into the second capturing composition mentioned earlier in FIG. 5 (*a*).

If it is recognized that the movement change of the specific object 400 corresponds to the third extent or the status change of the specific object 400 corresponds to the fourth extent based on the received sensing data, the controller 124 can capture the specific object 400 by changing a capturing composition into a third capturing composition. In this instance, the third capturing composition may correspond to a capturing composition different from the second capturing composition.

Specifically, if the speed of the specific object 400 exceeds a predetermined speed and the extent of altitude change of the specific object 400 exceeds the predetermined extent, the controller 124 can recognize the extent of the movement change of the specific object 400 as the third extent.

The controller 124 can recognize whether or not the extent of the status change of the specific object 400 corresponds to the fourth extent using information on whether or not a gesture of the specific object 400 corresponds to a gesture appearing when exceeding the predetermined speed, information on whether or not a pulse of the specific object 400 deviates from an average pulse as much as a predetermined range, information on whether or not respiration of the specific object 400 changes as much as a predetermined range compared to a usual respiration pattern, and information on whether or not body temperature and an amount of perspiration of the specific object 400 deviate from average body temperature and a usual amount of perspiration as much as a predetermined extent.

As shown in FIG. 7 (*a*), the third capturing composition may correspond to a capturing composition for capturing the entire body of the specific object 400 at the front of the specific object 400. In this instance, referring to FIG. 7 (*b*), the controller 124 can control the flying unit 110 to make the drone 100 maintain a location apart from the specific object 400 as much as a predetermined distance (a) and a predetermined altitude (h) and fly in a direction corresponding to a moving direction of the specific object 400 with a speed corresponding to a moving speed of the specific object 400 at the front of the specific object 400. And, in order to continuously capture the specific object 400, the controller 124 can change a capturing angle of the camera 130 by controlling the movement of the camera 130.

Figure 8:
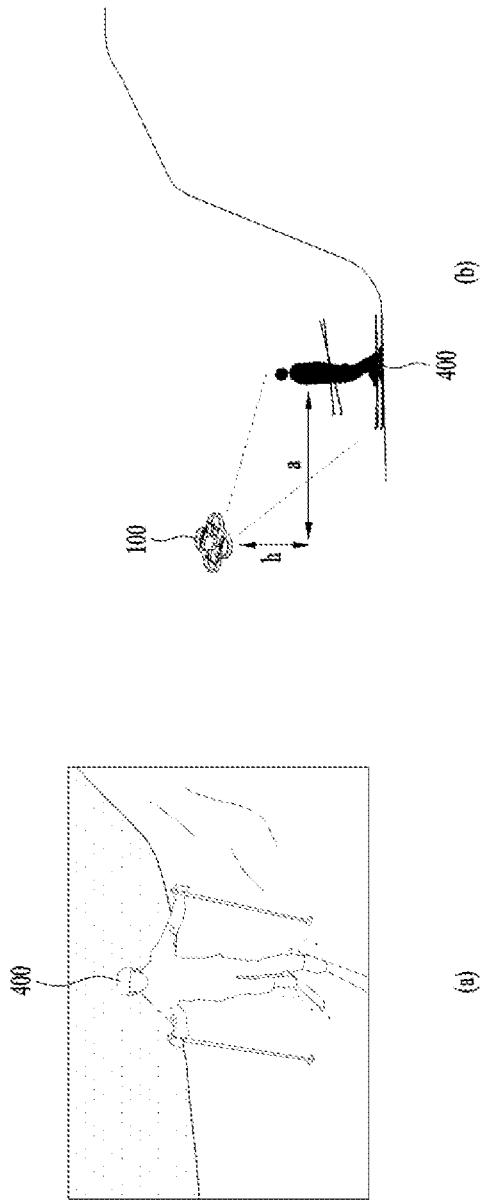

If the controller 124 recognizes capturing end timing based on the movement change of the specific object and the status change of the specific object 400, the controller 124 can change a capturing composition. Specifically, if the controller 124 recognizes at least one situation among a situation that the movement change of the specific object 400 is reduced and a situation that the status of the specific object 400 is changed to a stable state from an excited state, the controller 124 can change a capturing composition to a fourth capturing composition. As shown in FIG. 8 (*a*), the fourth capturing composition may correspond to a capturing composition for mainly capturing facial expression of the specific object 400 and posture of the specific object 400 at the front of the specific object 400.

The controller 124 can determine at least one of a capturing angle of the specific object 400 and a capturing position of the specific object 400 based on the fourth capturing composition. Specifically, referring to FIG. 8 (*b*), in order to capture the specific object 400 with the capturing composition mentioned earlier in FIG. 8 (*a*), the controller 124 can control the flying unit 110 to make the drone 100 fly while maintaining a location apart from the specific object 400 as much as a predetermined distance (a) and a predetermined altitude (h) at the front of the specific object 400. And, in order to capture the specific object 400 with the capturing composition mentioned earlier in FIG. 8 (*a*), the controller 124 can change a capturing angle of the camera by controlling the movement of the camera 300.

The aforementioned embodiments can capture a user with various compositions in consideration of various situations of the user of the mobile terminal without a separate person for controlling a drone.

Meanwhile, according to an embodiment of the present invention, a drone recognizes a type of an activity of a specific object and can change a capturing composition in consideration of the recognized type of the activity of the specific object. Regarding this, it is explained in more detail in the following with reference to FIG. 9.

FIG. 9 is a diagram illustrating an example of a method of changing a capturing composition according to a type of activity of a specific object in a drone according to one embodiment of the present invention. In relation to FIG. 9, explanation on contents overlapped with FIGS. 1 to 8 is omitted. In the following, a difference is mainly explained.

According to one embodiment of the present invention, the controller 124 can control the communication unit 121 to receive sensing data from a mobile terminal with which communication is connected. The controller 124 can recognize at least one of a movement change of a specific object and a status change of the specific object based on the sensing data.

The controller 124 can recognize a type of an activity of the specific object. A type of a current activity of the specific object can be recognized based on at least one of the movement change of the specific object and the status change of the specific object or can be recognized by transmitting information on an activity selected in the mobile terminal to a drone.

Assume that the type of the activity of the specific object 400 is recognized as running in FIG. 9 (*a*) and the type of the activity of the specific object 400 is recognized as skiing in FIG. 9 (*b*). Referring to FIG. 9 (*a*), the controller 124 recognizes the type of the activity of the specific object 400 as running. If the movement change of the specific object 400 and the status change of the specific object 400 are recognized, the controller 124 can change a capturing composition into a first capturing composition.

In this instance, the first capturing composition may correspond to a capturing composition for capturing the specific object 400 in the air while moving with a speed identical to a speed of the specific object 400 at the front of the specific object 400. In addition, the controller 124 can control the flying unit 110 to make the drone 100 maintain a location apart from the specific object 400 as much as a predetermined distance (a) and a predetermined altitude (h) and fly in a direction corresponding to a moving direction of the specific object 400 with a speed corresponding to a moving speed of the specific object 400 at the front of the specific object 400. And, in order to continuously capture the specific object 400, the controller 124 can change a capturing angle of the camera 130 by controlling the movement of the camera 130.

Referring to FIG. 9 (*b*), the controller 124 recognizes the type of the activity of the specific object 400 as skiing. If the movement change of the specific object 400 and the status change of the specific object 400 are recognized, the controller 124 can change a capturing composition into a second capturing composition. In this instance, the second capturing composition may correspond to a capturing composition for capturing the specific object 400 in the air while moving with a speed identical to a speed of the specific object 400 at the back of the specific object 400.

In addition, the controller 124 can control the flying unit 110 to make the drone 100 maintain a location apart from the specific object 400 as much as a predetermined distance (a) and a predetermined altitude (h) and fly in a direction corresponding to a moving direction of the specific object 400 with a speed corresponding to a moving speed of the specific object 400 at the back of the specific object 400. And, in order to continuously capture the specific object 400, the controller 124 can change a capturing angle of the camera 130 by controlling the movement of the camera 130.

Consequently, the capturing composition of the specific object 400 may vary depending on a type of an activity of the specific object 400. Information on a capturing composition appropriate for a type of each activity can be stored in the memory 122 in advance. According to the present embodiment, a drone automatically sets a capturing composition appropriate for a type of an activity of a specific object to capture the specific object. Hence, it can capture an excellent video without a professional cameraman.

Meanwhile, according to an embodiment of the present invention, a drone recognizes surrounding geographic information and can then change a capturing composition in consideration of the recognized surrounding geographic information. Regarding this, it is explained in more detail with reference to FIG. 10 in the following.

Figure 10:
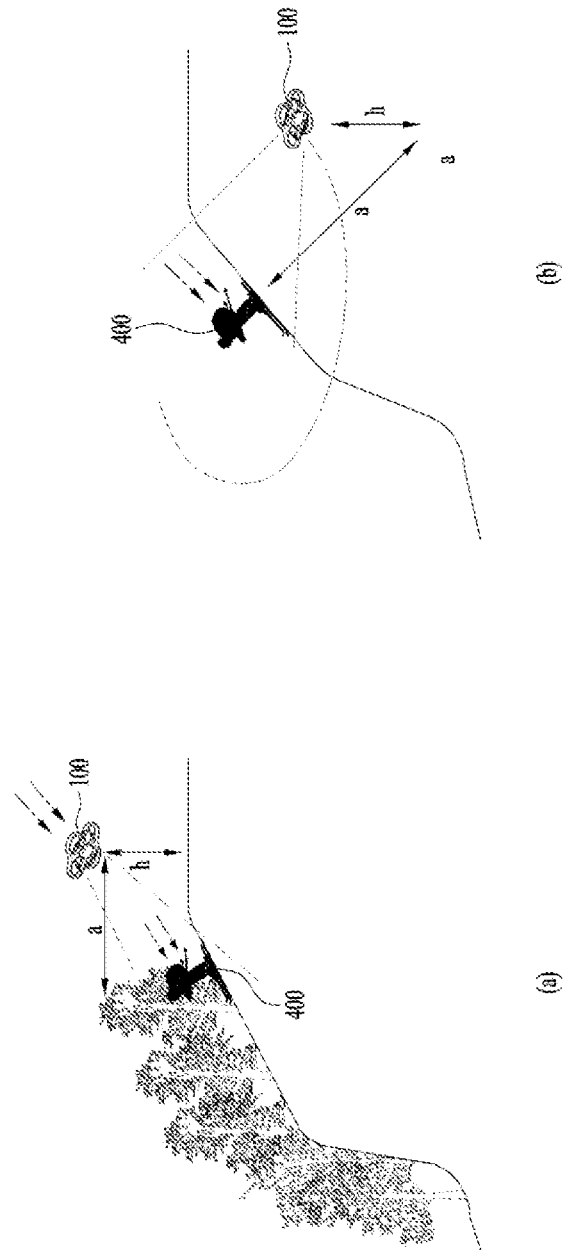
FIG. 10 is a diagram illustrating an example of a method of changing a capturing composition according to surrounding geography in a drone according to one embodiment of the present invention.

In particular, FIG. 10 is a diagram illustrating an example of a method of changing a capturing composition according to surrounding geography in a drone according to one embodiment of the present invention.

According to one embodiment of the present invention, the controller 124 can control the communication unit 121 to receive sensing data from a mobile terminal with which communication is connected. The controller 124 can recognize at least one of a movement change of a specific object and a status change of the specific object based on the sensing data.

The controller 124 can recognize surrounding geographic information of the specific object. In this instance, the surrounding geographic information can include information on a slope near the specific object, information on a barrier existing near the specific object, and the like, by which the present invention may be non-limited. The surrounding geographic information can also include information on a famous building existing in the vicinity of the specific object, information on a tourist attraction existing in the vicinity of the specific object, and the like.

The controller 124 can receive the surrounding geographic information from a mobile terminal or can recognize the surrounding geographic information by analyzing a video captured by the camera 130. Assume that it is recognized as a barrier exists in the vicinity of the specific object 400 in FIG. 10 (*a*) and it is recognized as a barrier does not exist in the vicinity of the specific object 400 in FIG. 10 (*b*).

Referring to FIG. 10 (*a*), the controller 124 recognizes that a barrier exists in the vicinity of the specific object 400 based on surrounding geographic information of the specific object 400. If a movement change of the specific object 400 and a status change of the specific object are recognized, the controller 124 can change a capturing composition into a first capturing composition.

In this instance, the first capturing composition may correspond to a capturing composition for capturing the specific object 400 in the air while moving with a speed identical to a speed of the specific object 400 at the back of the specific object 400.

In this instance, the controller 124 can control the flying unit 110 to make the drone 100 maintain a location apart from the specific object 400 as much as a predetermined distance (a) and a predetermined altitude (h) and fly in a direction corresponding to a moving direction of the specific object 400 with a speed corresponding to a moving speed of the specific object 400 at the back of the specific object 400. And, in order to continuously capture the specific object 400, the controller 124 can change a capturing angle of the camera 130 by controlling the movement of the camera 130.

Referring to FIG. 10 (*b*), the controller 124 recognizes that a barrier does not exist in the vicinity of the specific object 400 based on surrounding geographic information of the specific object 400. If a movement change of the specific object 400 and a status change of the specific object are recognized, the controller 124 can change a capturing composition into a second capturing composition.

In this instance, the second capturing composition may correspond to a capturing composition for capturing the entire body of the specific object 400 while flying around over the specific object 400. In addition, the controller 124 can control the flying unit 110 to make the drone 100 maintain a location apart from the specific object 400 as much as a predetermined distance (a) and a predetermined altitude (h) and fly around over the specific object 400. And, in order to continuously capture the specific object 400 although a location of the drone 100 is changed, the controller 124 can control the movement of the camera 130.

Consequently, the capturing composition of the specific object 400 may vary depending on surrounding geographic information of the specific object 400. Information on a capturing composition appropriate for surrounding geographic information can be stored in the memory 122 in advance.

According to the present embodiment, a drone automatically sets a capturing composition appropriate for surrounding geographic information of a specific object to capture the specific object. Hence, an excellent video can be captured without a professional cameraman.

According to one embodiment of the present invention, captured videos can be transmitted to a mobile terminal with which communication is connected. It can arranges the videos based on at least one of information on a location at which a video is captured, information on a status change of a specific object at the time of capturing a video, and information on a movement change of the specific object at the time of capturing a video in the mobile terminal. Regarding this, it is explained in more detail with reference to FIGS. 11 to 13 in the following.

Figure 11:
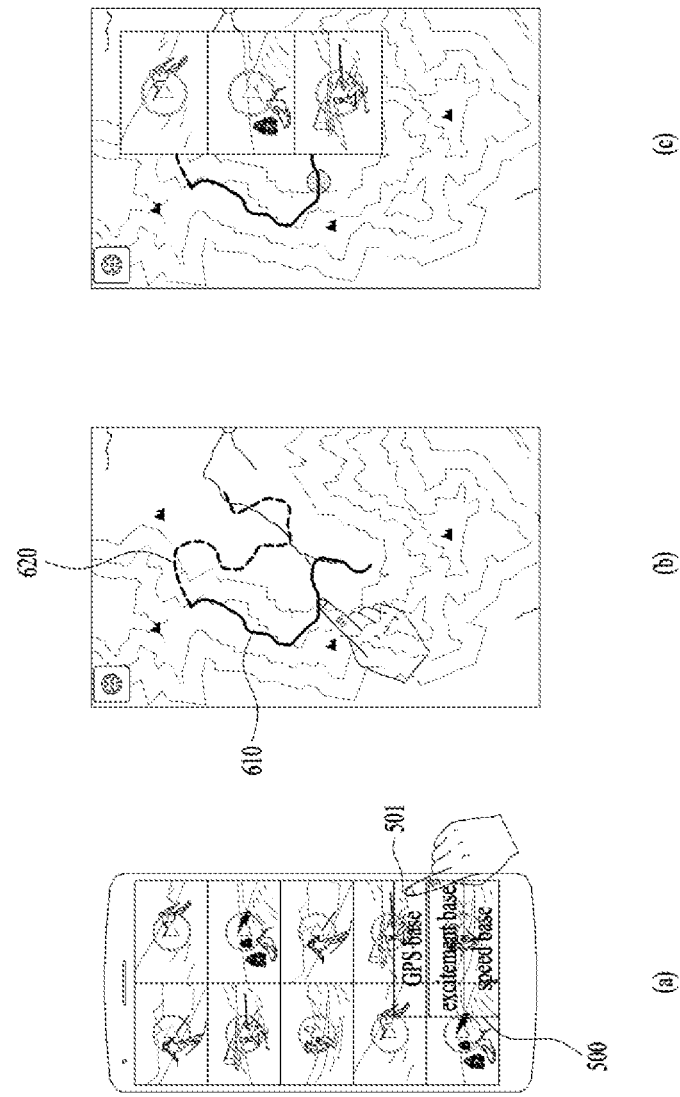
FIG. 11 is a diagram illustrating an example of a method of arranging videos captured by a drone in a mobile terminal according to one embodiment of the present invention.

FIG. 11 is a diagram illustrating an example of a method of arranging videos captured by a drone in a mobile terminal according to one embodiment of the present invention. In relation to FIG. 11, explanation on contents overlapped with the contents mentioned earlier in FIGS. 1 to 10 is omitted. A difference is mainly explained in the following.

According to one embodiment of the present invention, a drone 100 receives sensing data obtained by a mobile terminal and can capture a specific object via the camera 130 based on the sensing data. The drone 100 can transmit a video captured via the camera 130 to the mobile terminal.

The mobile terminal 100 can obtain information on a location at which the video is captured when the video is received. As an example, when the video is received, the mobile terminal can also receive the information on the location at which the video is captured to receive the information on the location at which the video is captured.

As a different example, if a location of the mobile terminal changes as time goes by, the mobile terminal can store location information of the mobile terminal according to time change in the memory. If the mobile terminal receives the video and obtains information on time at which the video is captured, the mobile terminal can recognize location information of the mobile terminal at the time at which the video is captured. The mobile terminal can obtain information on the location at which the video is captured based on the recognized location information.

An algorithm of obtaining the location at which the video is captured can be stored in the memory of the mobile terminal in advance. The mobile terminal can store the video in the memory when the video is received. The information on the location at which the video is capture can also be stored in the memory when the video is stored in the memory.

Meanwhile, at least one or more videos received from the drone can be stored in the mobile terminal. The mobile terminal can display each of thumbnail images corresponding to the at least one or more videos on a screen according to a command for displaying the at least one or more videos.

Referring to FIGS. 11 (*a*) and (*b*), if a command for selecting a first indicator 501 included in a menu window 500 selected by a user of the mobile terminal is detected (FIG. 11 (*a*)), the mobile terminal can search for a map corresponding to the location information on the Internet based on the information on the location at which the video is captured. The mobile terminal can output the searched map on the screen. In this instance, the mobile terminal can provide a specific visual effect to a path of the video captured by the drone 100 in the output map (FIG. 11 (*b*)).

For example, if the drone captures videos on a first path and a second path, the mobile terminal can provide a predetermined visual effect to a first region 610 corresponding to the first path and a second region 620 corresponding to the second path, respectively. Depending on an embodiment, it may provide a first visual effect and a second visual effect to the first region 610 and the second region 620, respectively. In particular, the first visual effect may be different from the second visual effect (e.g., visual effects represented by a different color).

As shown in FIG. 11 (*b*), if a command for selecting the first region 610 is detected, the mobile terminal can extract at least one or more videos captured at the first path corresponding to the first region 610 from the memory. The mobile terminal can extract at least one or more thumbnail images using the at least one or more extracted videos. And, as shown in FIG. 11 (*c*), the mobile terminal can display the at least one or more extracted thumbnail images on the screen.

The at least one or more extracted thumbnail images may correspond to a representative thumbnail image of the at least one or more extracted videos. An algorithm for extracting the representative thumbnail image from the videos can be stored in the memory in advance.

If a command for selecting a specific thumbnail image from among the at least one or more thumbnail images displayed on the screen is detected, the mobile terminal can output a video corresponding to the selected thumbnail image. According to the aforementioned embodiment, when there are many videos captured by the drone, a user can easily find out a video preferred by the user using a location at which the video is captured.

Figure 12:
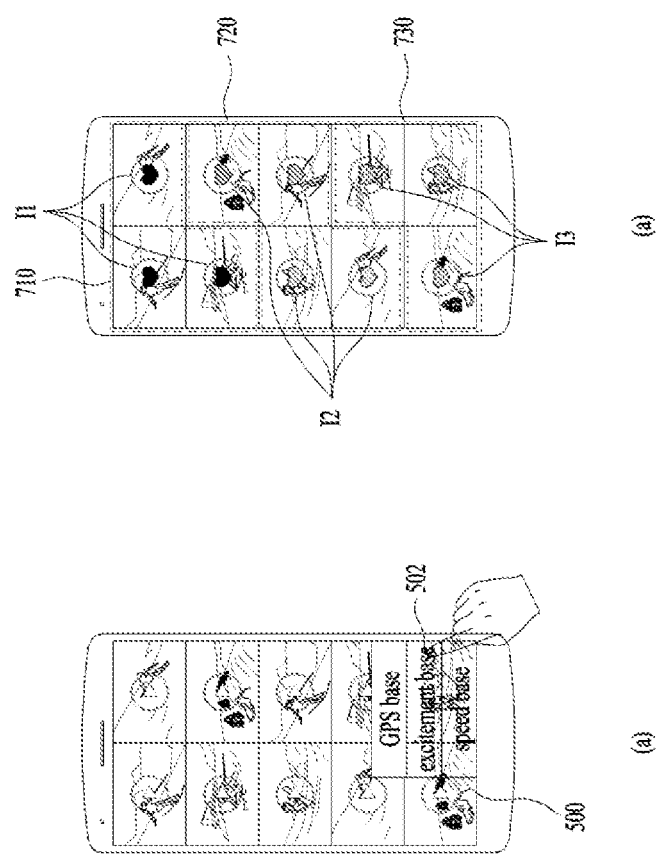
FIG. 12 is a diagram illustrating a different example of a method of arranging videos captured by a drone in a mobile terminal according to one embodiment of the present invention.

Next, FIG. 12 is a diagram illustrating a different example of a method of arranging videos captured by a drone in a mobile terminal according to one embodiment of the present invention. According to one embodiment of the present invention, a drone 100 receives sensing data obtained by a mobile terminal and can capture a specific object (e.g., a user of the mobile terminal) via the camera 130 based on the sensing data. The drone 100 can transmit a video captured via the camera 130 to the mobile terminal.

When the video is received, the mobile terminal 100 can obtain information on a status of the specific object at the time at which the video is captured. As an example, when the video is received, the mobile terminal can also receive the information on the status of the specific object to receive the information on the status of the specific object.

As a different example, if a status of a user of the mobile terminal changes as time goes by, the mobile terminal can store the status of the user of the mobile terminal according to time change in the memory. If the mobile terminal receives the video and obtains information on time at which the video is captured, the mobile terminal can recognize the status of the user of the mobile terminal at the time at which the video is captured. The mobile terminal can obtain information on a status of the specific object at the time at which the video is captured based on the recognized status of the user.

An algorithm for obtaining the status information of the specific object at the time at which the video is captured can be stored in the memory of the mobile terminal in advance. The mobile terminal can store the video in the memory when the video is received. The status information of the specific object at the time at which the video is captured can also be stored in the memory when the video is stored in the memory.

In relation to FIG. 12, assume that a plurality of videos captured by the drone are stored in the memory. If a command for selecting a second indicator 502 included in a menu window 500 selected by a user of the mobile terminal is detected (FIG. 12 (a)), the mobile terminal can arrange a plurality of the videos based on the status information of the specific object at the time at which each of a plurality of the videos is captured. (FIG. 12 (b)).

Specifically, the status of the specific object can be classified into a first status, a second status, and a third status. The first status (e.g., extremely excited state) corresponds to a status that the specific object is in a most excited state. The first status corresponds to a status that a body temperature of the specific object, a pulse of the specific object, and the like exceed the first extent and the second extent.

The second status (e.g., moderately excited state) corresponds to a status indicating that the specific object is in a moderately excited state. The second status corresponds to a status that a body temperature of the specific object, a pulse of the specific object, and the like are within the first extent and exceed the second extent.

The third status (e.g., stable state) corresponds to a status that the specific object is in a stable state. The third status corresponds to a status that a body temperature of the specific object, a pulse of the specific object, and the like are within the first extent and the second extent.

Among a plurality of the images, the mobile terminal can display at least one or more thumbnail images of which the status of the specific object corresponds to the first status on a first region 710. Among a plurality of the images, the mobile terminal can display at least one or more thumbnail images of which the status of the specific object corresponds to the second status on a second region 720. Among a plurality of the images, the mobile terminal can display at least one or more thumbnail images of which the status of the specific object corresponds to the third status on a third region 730.

In this instance, the first region may correspond to a region located at the top of the screen, the second region may correspond to a region located under the first region 710, and the third region may correspond to a region located under both the first region 710 and the second region 720.

The mobile terminal can display an indicator indicating the status of the specific object on each of the thumbnail images displayed on the screen. For example, the mobile terminal can display a first indicator (I1) on the thumbnail images displayed on the first region 710, display a second indicator (I2) on the thumbnail images displayed on the second region 720, and display a third indicator (I3) on the thumbnail images displayed on the third region 730.

If a command for selecting a specific thumbnail image from among at least one or more thumbnail images displayed on the screen is detected, the mobile terminal can output a video corresponding to the selected thumbnail image. According to the aforementioned embodiment, if there are many videos captured by a drone, a user can easily find out a video preferred by the user from among the videos.

Figure 13:
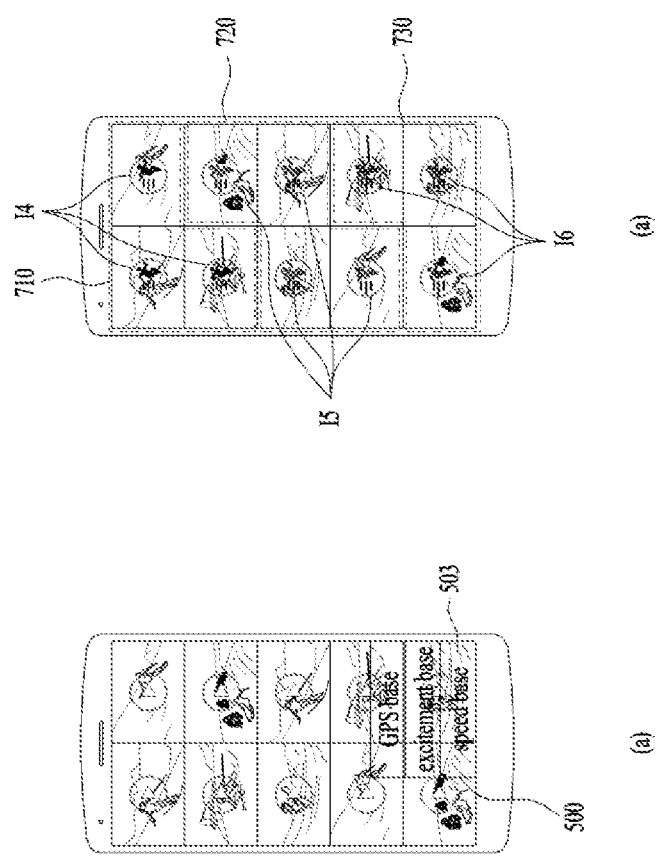
FIG. 13 is a diagram illustrating a further different example of a method of arranging videos captured by a drone in a mobile terminal according to one embodiment of the present invention.

FIG. 13 is a diagram illustrating a further different example of a method of arranging videos captured by a drone in a mobile terminal according to one embodiment of the present invention. According to one embodiment of the present invention, a drone 100 receives sensing data obtained by a mobile terminal and can capture a specific object (e.g., a user of the mobile terminal) via the camera 130 based on the sensing data. The drone 100 can transmit a video captured via the camera 130 to the mobile terminal.

When the video is received, the mobile terminal 100 can obtain information on a movement change of the specific object at the time at which the video is captured. In this instance, the information on the movement change of the specific object may correspond to information indicating a moving speed of a user of the mobile terminal at the time at which the video is captured.

As an example, when the video is received, the mobile terminal can also receive the information on the movement change of the specific object to receive the information on the movement change of the specific object. As a different example, if a movement of a user of the mobile terminal changes as time goes by, the mobile terminal can store the movement of the user of the mobile terminal according to time change in the memory.

If the mobile terminal receives the video and obtains information on time at which the video is captured, the mobile terminal can recognize the movement change of the user of the mobile terminal at the time at which the video is captured. The mobile terminal can obtain information on a movement change of the specific object at the time at which the video is captured based on the recognized movement change of the user.

An algorithm for obtaining the information on the movement change of the specific object at the time at which the video is captured can be stored in the memory of the mobile terminal in advance. The mobile terminal can store the video in the memory when the video is received. The information on the movement change of the specific object at the time at which the video is captured can also be stored in the memory when the video is stored in the memory.

In relation to FIG. 13, assume that a plurality of videos captured by the drone are stored in the memory. If a command for selecting a third indicator 503 included in a menu window 500 selected by a user of the mobile terminal is detected (FIG. 13 (a)), the mobile terminal can arrange a plurality of the videos based on the information on the movement change of the specific object at the time at which each of a plurality of the videos is captured. (FIG. 13 (b)).

Specifically, the extent of the movement change of the specific object can be classified into a first extent, a second extent, and a third extent. The first extent corresponds to the extent that the specific object moves with a fastest speed. The first extent may correspond to a state that the speed of the specific object exceeds the first speed and the second speed.

The second extent corresponds to the extent that the specific object moves with a moderate speed. The second extent may correspond to a state that the speed of the specific object is equal to or slower than the first speed and the speed of the specific object exceeds the second speed. The third extent corresponds to the extent that the specific object moves with a slowest speed. The third extent may correspond to a state that the speed of the specific object is equal to or slower than the first speed and the second speed.

Among a plurality of the images, the mobile terminal can display at least one or more thumbnail images of which the movement change of the specific object corresponds to the first extent on a first region 710. Among a plurality of the images, the mobile terminal can display at least one or more thumbnail images of which the movement change of the specific object corresponds to the second extent on a second region 720. Among a plurality of the images, the mobile terminal can display at least one or more thumbnail images of which the movement change of the specific object corresponds to the third extent on a third region 730.

In this instance, the first region may correspond to a region located at the top of the screen, the second region may correspond to a region located under the first region 710, and the third region may correspond to a region located under both the first region 710 and the second region 720. The mobile terminal can display an indicator indicating the extent of the movement change of the specific object on each of the thumbnail images displayed on the screen.

For example, the mobile terminal can display a first indicator (I4) on the thumbnail images displayed on the first region 710, display a second indicator (I5) on the thumbnail images displayed on the second region 720, and display a third indicator (I6) on the thumbnail images displayed on the third region 730. If a command for selecting a specific thumbnail image from among at least one or more thumbnail images displayed on the screen is detected, the mobile terminal can output a video corresponding to the selected thumbnail image.

According to the aforementioned embodiment, if there are many videos captured by a drone, a user can easily find out a video preferred by the user from among the videos.

Meanwhile, according to one embodiment of the present invention, a user of a mobile terminal can control a drone using a preview image displayed on the mobile terminal. Regarding this, it is explained in more detail with reference to FIGS. 14 to 17 in the following.

FIGS. 14 to 17 are diagrams illustrating an example of a method of controlling a drone according to one embodiment of the present invention. According to one embodiment of the present invention, when a preview image captured by the drone 100 is displayed on a mobile terminal, if a user input for moving a pointer touching the preview image to a prescribed direction is received, the drone 100 can move towards a direction (or drag direction) opposite to a drag direction input to the mobile terminal.

Figure 14:
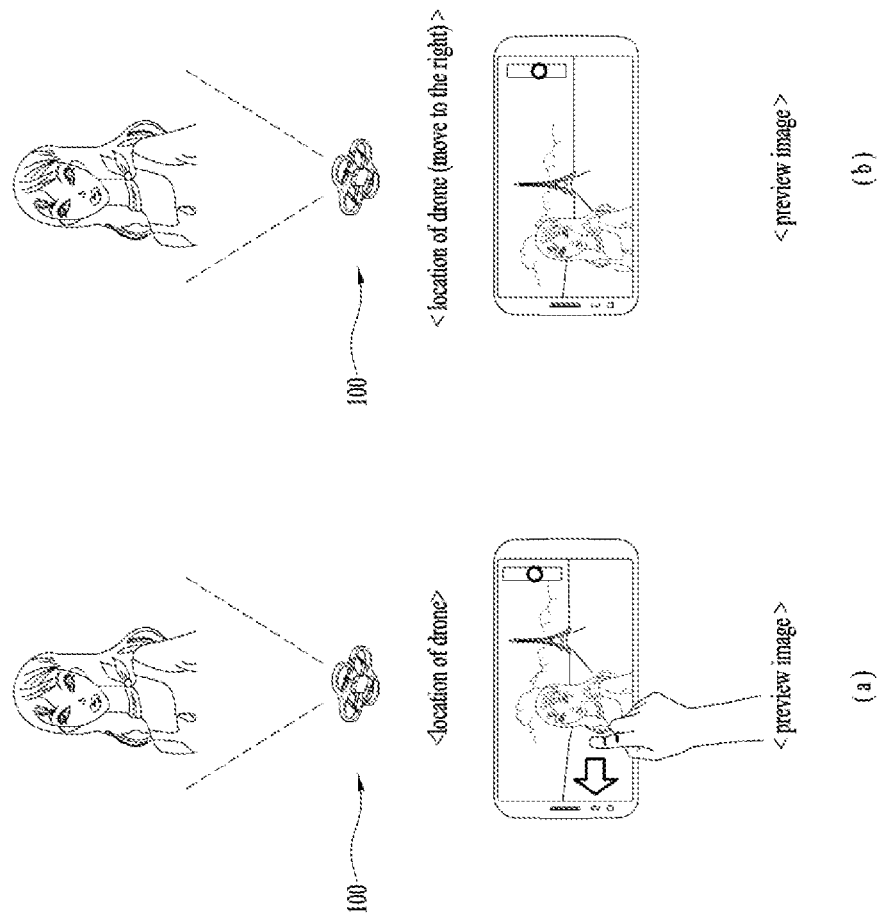
FIGS. 14 to 17 are diagrams illustrating an example of a method of controlling a drone according to one embodiment of the present invention.

As an example, if the pointer touching the preview image is dragged into the left (refer to FIG. 14 (a)), the mobile terminal can transmit a control signal to the drone 100 to indicate the drone to move to the right. As the drone 100 moves to the left, as shown in FIG. 14 (b), a composition of the preview image displayed on the mobile terminal is changed as well.

Figure 15:
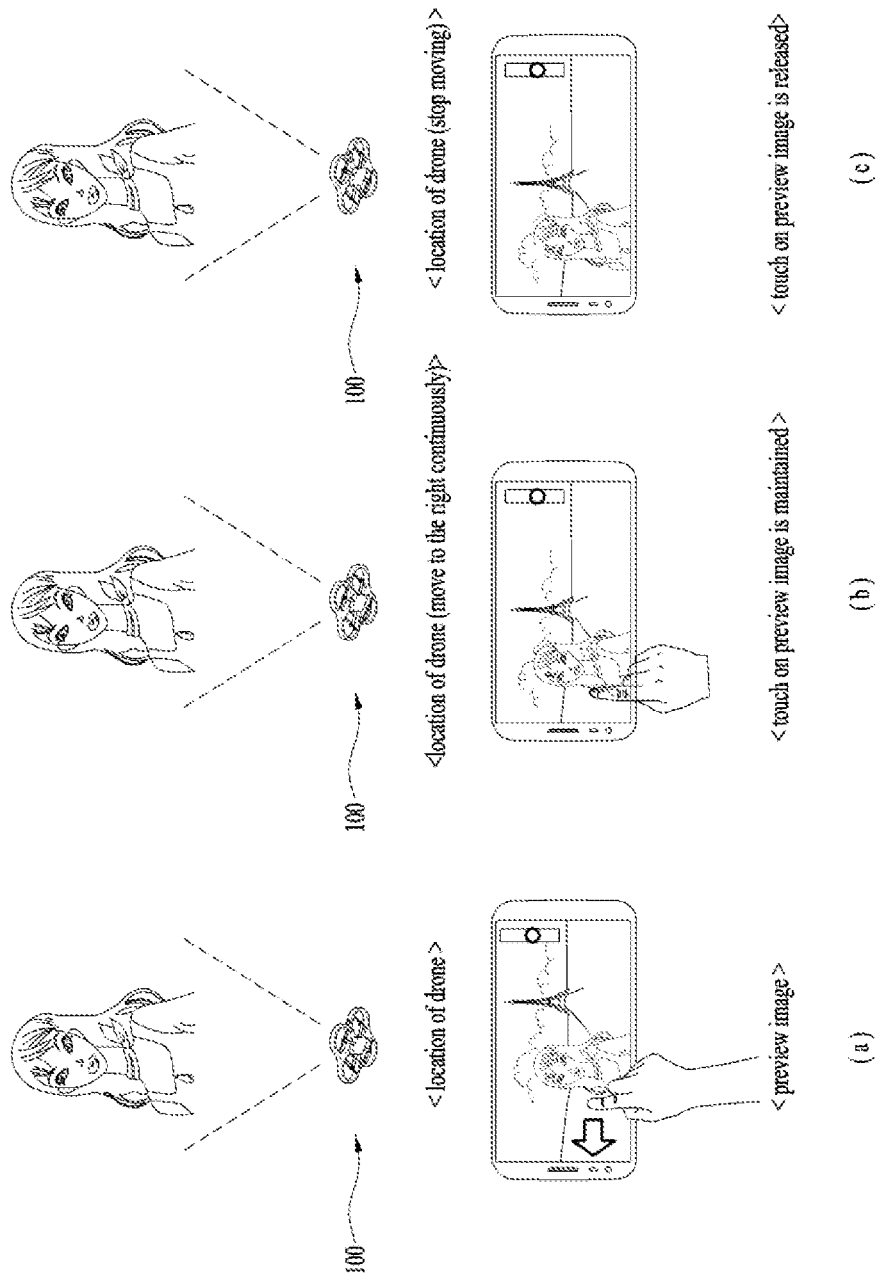

As a different example, if the pointer touching the preview image is dragged into the left (refer to FIG. 15 (a)) and the touch is continuously maintained (FIG. 15 (b)), the mobile terminal can transmit a control signal to the drone 100 to indicate the drone to move to the right. As the drone 100 moves to the left, as shown in FIG. 15 (b), a composition of the preview image displayed on the mobile terminal is changed as well. However, as shown in FIG. 15 (c), if the touch is released, the mobile terminal can transmit a control signal to the drone to indicate the drone to stop moving. In this instance, as shown in FIG. 15 (c), a preview image captured from the stopped location can be displayed on the mobile terminal.

Figure 16:
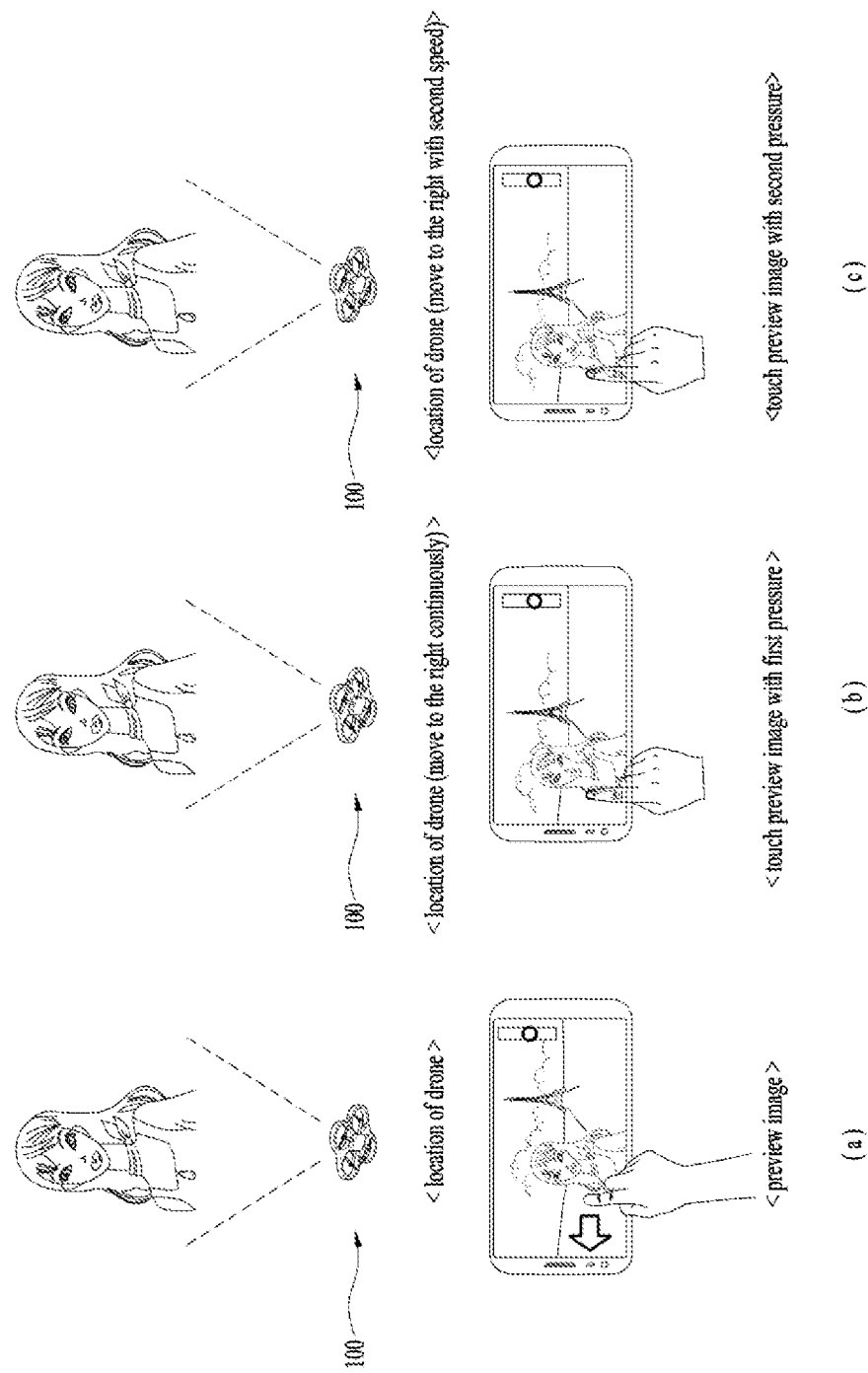

In another example, if the pointer touching the preview image is dragged into the left (refer to FIG. 16 (a)), the mobile terminal can transmit a control signal to the drone 100 to indicate the drone to move to the right. However, as shown in FIGS. 16 (b) and (c), it can recognize touch strength of the touch input on the mobile terminal and can then change a moving speed of the drone according to the recognized touch strength. Specifically, referring to FIG. 16 (b), if the mobile terminal recognizes the touch strength of the touch input on the mobile terminal as a first pressure, the mobile terminal can transmit a control signal to the drone 100 to indicate the drone to move to the right with a first speed corresponding to the first pressure. Referring to FIG. 16 (c), if the mobile terminal recognizes the touch strength of the touch input on the mobile terminal as a second pressure, the mobile terminal can transmit a control signal to the drone 100 to indicate the drone to move to the right with a second speed corresponding to the second pressure.

Figure 17:
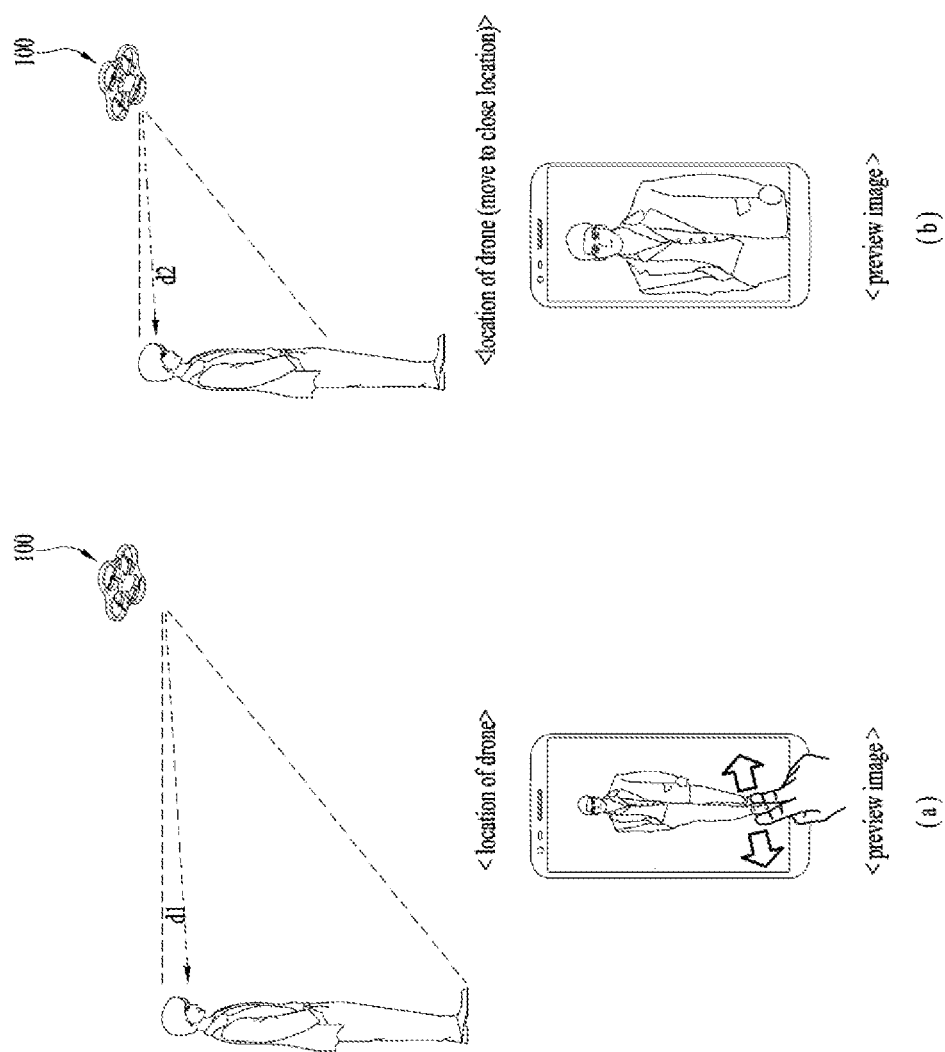

In another example, if a pinch-in input or a pinch-out input is received when a preview image received from the drone 100 is displayed via the mobile terminal, the mobile terminal can transmit a control signal to the drone 100 to indicate the drone to move forward or backward. For example, as shown in FIG. 17 (a), if a touch input (i.e., pinch-out input) for touching the preview image and increasing a distance between two pointers is received, the mobile terminal can transmit a control signal to the drone to indicate the drone to move forward. As the drone moves forward, a composition of the preview image displayed on the mobile terminal is changed as well. FIG. 17 (b) shows an example that a composition of capturing the entire body of a user is changed to a composition of capturing an upper body of the user in the preview image. According to the aforementioned embodiments, it can control the drone using a simple touch input to an image displayed on the mobile terminal.

FIGS. 18 to 21 are diagrams illustrating an example of a method of capturing a video by a drone by changing a capturing composition of a video stored in a memory of a mobile terminal.

According to one embodiment of the present invention, a mobile terminal controlling a drone recognizes a capturing composition of a video stored in a memory and can control the drone to capture a specific object based on the recognized capturing composition.

Specifically, the mobile terminal controlling the drone can store a plurality of videos in the memory. The mobile terminal can recognize a capturing composition of a video selected by a user from among a plurality of the videos stored in the memory. As an example, information on the capturing composition mapped to the video can be stored in the memory of the mobile terminal. The mobile terminal can recognize the capturing composition of the video selected by the user via the memory.

As a different example, the mobile terminal can recognize a specific object included in a video. The mobile terminal can recognize a capturing composition using a location of the recognized specific object and posture of the recognized specific object. In this instance, an algorithm for recognizing the capturing composition of the video selected by the user can be stored in the memory in advance.

If a command for capturing the specific object according to the recognized capturing composition is detected, the mobile terminal can transmit a control signal to the drone to capture the specific object by controlling a flying path of the drone and movement of the camera 130 of the drone. The drone 100 can determine a capturing location of the specific object and a capturing angle of the specific object using the signal transmitted by the mobile terminal. The drone 100 controls the flying unit 110 to make the drone fly based on at least one of the determined capturing location of the specific object and the determined capturing angle of the specific object and can control the camera 130 to control movement of the camera 130.

However, there may exist a capturing composition not satisfied with a user among the capturing composition of the video selected by the user. In this instance, according to an embodiment of the present invention, the user may change a part of the capturing composition only of the video selected by the user. Hence, the drone can capture the specific object using the capturing composition of the video selected by the user and the capturing composition that a part of the capturing composition is changed by the user.

Specifically, when a user watches a video via a mobile terminal, if the user finds out a capturing composition not satisfied with the user, pauses the video at a part captured by the unsatisfied capturing composition (refer to FIG. 18 (*a*)), and selects a capturing composition change indicator (refer to FIG. 18 (*b*)), the mobile terminal can display a screen (refer to FIG. 18 (*c*)) for changing a capturing composition. By doing so, the user can change a capturing composition of the paused part. A virtual object, which is generated based on the capturing composition of the paused video, can be displayed on the screen for changing the capturing composition. In this instance, 3D modeling is performed on a specific object included in the paused video and the specific object can be displayed as the virtual object.

The user can change a capturing composition by inputting a touch input on a screen shown in FIG. 18 (*c*). As an example, when the side of the virtual object is displayed, if the user touches a point of the screen for changing the capturing composition and drags the touch to the left (refer to FIG. 19 (*a*)), as shown in FIG. 19 (*b*), the mobile terminal can display the front side of the virtual object on the screen for changing the capturing composition. In this instance, the capturing composition for capturing the specific object can be changed to the capturing composition for capturing the front side of the specific object from the capturing composition for capturing the side of the specific object.

Figure 20:
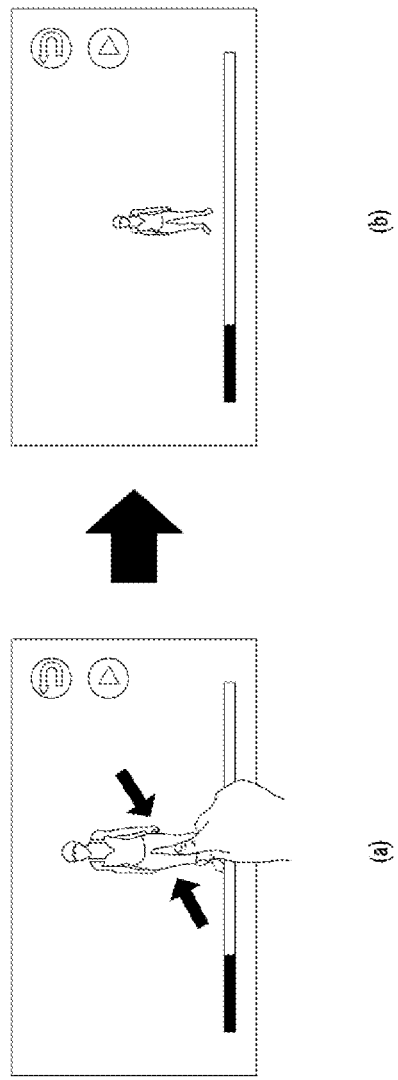

As a different example, when the front side of the virtual object is displayed by being magnified, if the user inputs a touch input (i.e., pinch-in input) touching two random points of the screen for changing the capturing composition and dragging the touch in a direction that a distance between the two points is decreasing (refer to FIG. 20 (*a*)), as shown in FIG. 20 (*b*), the mobile terminal can display the virtual object on the screen for changing the capturing composition by reducing a size of the virtual object. In this instance, the capturing composition for capturing the specific object can be changed to the capturing composition for capturing the specific object from the capturing composition for capturing a location away from the specific object.

Figure 21:
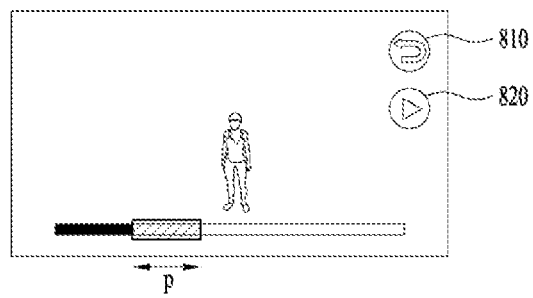

When a user changes a capturing composition, since it takes time for a drone to move and capture a video according to the changed capturing composition, there may exist a section incapable of changing a capturing composition. Hence, a mobile terminal can calculate time taken for the drone to move according to the changed capturing composition. Referring to FIG. 21, the mobile terminal can provide a predetermined visual effect (e.g., different color) to a section (P) incapable of being modified based on the calculated time in a progress bar. In this instance, the user is unable to change a capturing composition for the section (P) unless the user cancels capturing according to the changed capturing composition.

If the user selects a first icon 810, the mobile terminal can play the video again from the timing paused in FIG. 18 (*a*). If the user selects a second icon 820, the mobile terminal recognizes a capturing composition of a video after the paused timing of FIG. 18 (*a*) and can then continuously output the virtual object based on the recognized capturing composition.

Meanwhile, after the change of the capturing composition is completed by the user, if a command for performing capturing based on the changed capturing composition is input, the mobile terminal can transmit a control signal for controlling a flying path of the drone 100 and a movement of the camera 300 to the drone 100 to capture the specific object based on the changed capturing composition.

Consequently, according to the aforementioned embodiments, a user can capture a new video via a drone using a capturing composition of a video stored in the memory of the mobile terminal or can capture a new video via the drone by changing a part of the capturing composition of the video stored in the memory of the mobile terminal.

Method of Capturing Specific Object Based on Speed of Specific Object

In order to capture a specific object with various capturing compositions using a drone, it is necessary to have a person controlling the drone. Hence, there was a problem that the drone is unable to automatically capture the drone itself with various compositions based on a moving speed of the specific object.

According to one embodiment of the present invention, in order to solve the aforementioned problem, the drone can recognize the speed of the specific object and autonomously change a capturing composition based on the recognized speed to capture the specific object. In the following, a method of capturing a specific object based on a speed of the specific object is explained with reference to FIG. 22.

Figure 22:
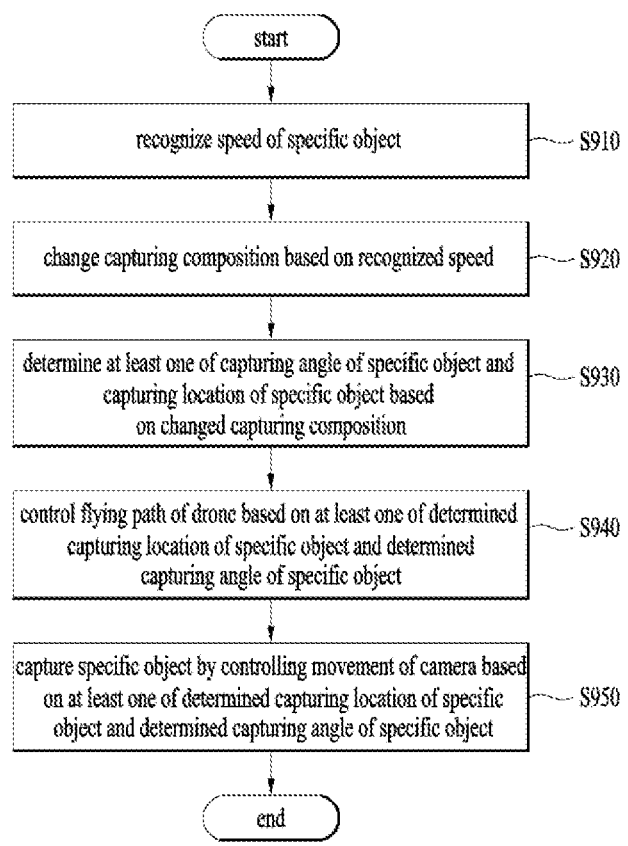
FIG. 22 is a flowchart illustrating a method of capturing a specific object by a drone according to a speed of a specific object according to one embodiment of the present invention.

FIG. 22 is a flowchart illustrating a method of capturing a specific object by a drone according to a speed of a specific object according to one embodiment of the present invention. In relation to FIG. 22, explanation on contents overlapped with the contents mentioned earlier in FIGS. 1 to 21 is omitted. A difference is mainly explained in the following.

According to one embodiment of the present invention, the controller 124 of the drone 100 can control the communication unit 121 to communicate with the mobile terminal that controls the drone. In this instance, the mobile terminal controlling the drone may correspond to one selected from the group consisting of a mobile phone, a smartphone, a specific external terminal for controlling the drone, and a mobile terminal of watch-type.

If a signal for capturing a specific object in a specific capturing mode is received from the mobile terminal, the controller 124 of the drone 100 can control the camera 130 to capture the specific object. In this instance, the specific capturing mode may correspond to a capturing mode for continuously capturing the specific object while maintaining a distance as much as a predetermined distance from the specific object and the capturing mode for changing a capturing composition according to a speed of the specific object.

The specific object may correspond to a user of a mobile terminal. Specifically, since the drone 100 captures the mobile terminal by being apart from the mobile terminal as much as a predetermined distance, a user holding the mobile terminal is captured as well. Hence, the user holding the mobile terminal may become the specific object.

The controller 124 can control the flying unit 110 to fly while tracking the specific object in the specific capturing mode and control a movement of the camera 131 to continuously capture the specific object. The controller 124 can recognize a speed of the specific object (S310).

Specifically, the controller 124 can recognize a current speed of the drone 100 and a flying path of the drone 100. The controller 124 can recognize a speed of the specific object using at least one of the recognized current speed of the drone 100, the recognized flying path of the drone 100, and a video captured by the camera 130. A method of recognizing the speed of the specific object shall be described later with reference to FIGS. 23 to 25.

An algorithm for recognizing the speed of the drone 100 can be stored in the memory in advance. The controller 124 can change a capturing composition based on the recognized speed (S920). As an example, if the speed of the specific object corresponds to a first speed, the controller 124 changes a capturing composition into a first capturing composition. If the speed of the specific object corresponds to a second speed, the controller 124 changes a capturing composition into a second capturing composition. In this instance, the first capturing composition may correspond to a capturing composition most appropriate for capturing a video in the first speed and the second capturing composition may correspond to a capturing composition most appropriate for capturing a video in the second speed.

Information on a capturing composition mapped to each speed can be stored in the memory 122 in advance. The controller 124 can determine at least one of a capturing angle of the specific object and a capturing location of the specific object based on the capturing composition which is changed in the step S920 (S930). The capturing angle may correspond to an angle for capturing the specific object in the air. In this instance, the capturing angle may correspond to an angle changed by changing a flying path of the drone, an altitude of the drone, a movement of the camera 130, and the like.

Consequently, if the capturing angle is determined, it can determine the flying path of the drone, the altitude of the drone, and the movement of the camera 130. The capturing location of the specific object corresponds to a location at which the specific object is captured. The capturing location may correspond to the front, the back, the right, the left of the specific object, and the like.

As an example, if the capturing location of the specific object corresponds to the back of the specific object, the drone can capture the specific object while flying and tracking the specific object at the back of the specific object. As a different example, if the capturing location of the specific object corresponds to the right of the specific object, the drone can capture the specific object while flying at the right of the specific object with a speed identical to the speed of the specific object.

A capturing location and a capturing angle corresponding to each capturing composition can be stored in the memory in advance. The controller 124 can control the flying unit 110 to make the drone fly based on at least one of the determined capturing location of the specific object and the determined capturing angle of the specific object (S940).

An algorithm for setting the flying path of the drone using the capturing location of the specific object and the capturing angle of the specific object can be stored in the memory 122 in advance. The controller 124 controls the movement of the camera 130 based on at least one of the determined capturing location of the specific object and the determined capturing angle of the specific object to capture the specific object (S950).

An algorithm for setting the movement of the camera using the capturing location of the specific object and the capturing angle of the specific object can be stored in the memory 122 in advance. Consequently, a capturing composition for capturing the specific object is changed based on a movement change of the specific object and a status change of the specific object. The flying path of the drone 100 and the movement of the camera are determined according to the changed capturing composition.

According to one embodiment of the present invention, the controller 124 can control the communication unit 121 to transmit a video including a specific object, which is captured according to the changed capturing composition, to the mobile terminal to which the communication is connected. According to the present embodiment, it can capture a video of various compositions based on a speed of the specific object without a person that controls the drone.

Method of Recognizing Speed of Specific Object

According to one embodiment of the present invention, a drone 100 can recognize a speed of a specific object. In the following, a method of recognizing the speed of the specific object is explained with reference to FIGS. 23 to 25.

Figure 23:
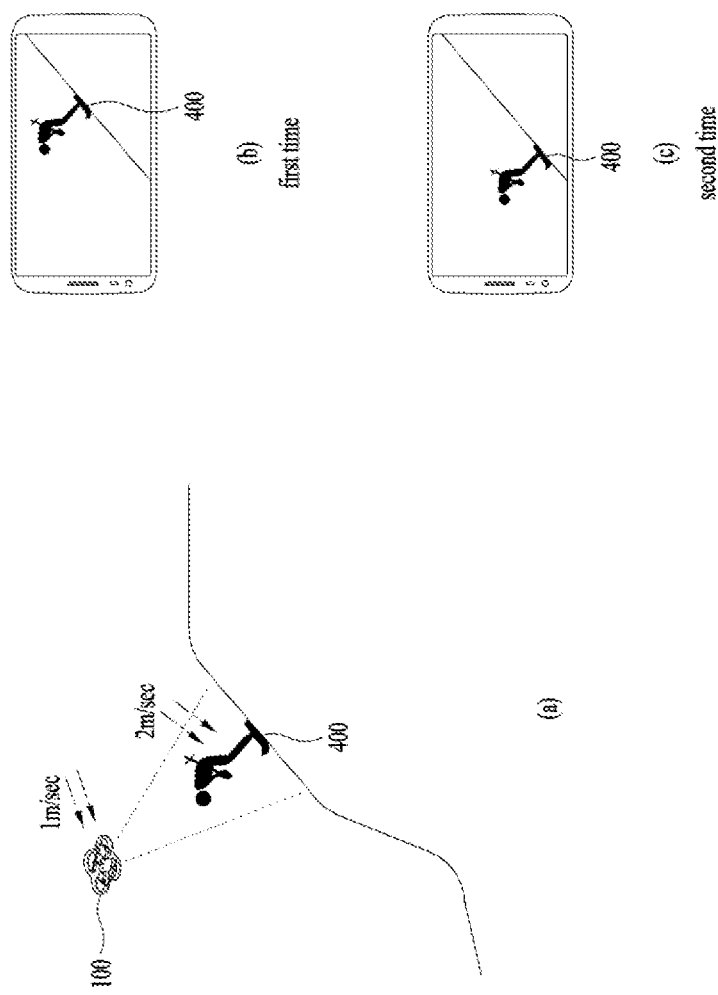
FIG. 23 is a diagram illustrating an example of a method of recognizing a speed of a specific object in a drone according to one embodiment of the present invention.

FIG. 23 is a diagram illustrating an example of a method of recognizing a speed of a specific object in a drone according to one embodiment of the present invention. A difference is mainly explained in the following. In FIG. 23, for clarity, assume that the drone 100 captures the specific object while flying at the side of the specific object in a direction identical to a direction of the specific object with a speed different from the speed of the specific object.

The controller 124 can recognize a current speed of the drone 100 and a flying path of the drone 100. In this instance, the current speed of the drone may correspond to a speed calculated based on a distance which is changed in consideration of an altitude change of the drone, a planar location change of the drone, and the like. The flying path of the drone 100 can be determined based on a flying altitude of the drone and a moving direction of the drone 100.

For example, referring to FIG. 23 (*a*), the controller 124 can recognize an actual moving distance of the drone 100 using a planar moving distance of the drone 100 and an altitude change of the drone 100. If it is recognized as the drone moves 1 m corresponding to the actual moving distance in 1 second, the controller 124 can recognize the current speed of the drone as 1 m/sec.

The controller 124 can recognize a moving speed of the specific object using at least one of the recognized current speed, the recognized flying path of the drone, and a video including the specific object captured via the camera 130. First of all, if it is recognized as the specific object 400 included in the video is located at a first location at a first time (FIG. 23 (*b*)) and the specific object moves to a second location at a second time (FIG. 23 (*b*)), the controller 124 can recognize a moving speed of the specific object 400 which has moved in the video. An algorithm for recognizing the moving speed of the specific object included in the video can be stored in the memory 122 in advance.

For example, if the specific object moves to the second location (refer to FIG. 23 (*c*)) from the first location (refer to FIG. 23 (*b*)), the controller 124 can recognize it as the specific object has moved 1 m. If it is recognized as time taken for the specific object to move 1 m corresponds to 1 second, the controller 124 can recognize the moving speed of the specific object as 1 m/sec in the video.

The controller 124 recognizes a direction to which the specific object moves using the video and can recognize whether or not the moving direction of the drone 100 corresponds to the recognized direction. If it is recognized as the flying path of the drone 100 corresponds to the recognized direction, the controller 124 adds up the recognized current speed of the drone 100 and the speed of the specific object obtained from the video to recognize the speed of the specific object.

For example, when the specific object 400 included in the video moves to the second location (FIG. 23 (*b*)) from the first location (FIG. 23 (*b*)), if it is recognized as the moving direction of the specific object corresponds to the moving direction of the drone 100, the controller 124 adds up the current speed of the drone (1 m/sec) and the moving speed of the specific object (1 m/sec) recognized from the video. In particular, the controller 124 can recognize 2 m/sec as the speed of the specific object.

Consequently, the controller 124 can recognize the speed of the specific object using at least one of the current speed of the drone, the flying path of the drone, and the video captured by the camera 130.

FIG. 24 is a diagram illustrating a different example of a method of recognizing a speed of a specific object in a drone according to one embodiment of the present invention. In relation to FIG. 24, explanation on contents overlapped with the contents mentioned earlier in FIGS. 1 to 23 is omitted. A difference is mainly explained in the following. In FIG. 24, for clarity, assume that the drone 100 captures the specific object while flying at the front of the specific object in a direction opposite to a direction of the specific object with a speed different from the speed of the specific object.

The controller 124 can recognize a current speed of the drone 100 and a flying path of the drone 100. In this instance, the current speed of the drone may correspond to a speed calculated based on a distance which is changed in consideration of an altitude change of the drone, a planar location change of the drone, and the like. The moving path of the drone 100 can be determined based on a flying altitude of the drone and a moving direction of the drone 100.

For example, referring to FIG. 24 (*a*), the controller 124 can recognize an actual moving distance of the drone 100 using a planar moving distance of the drone 100 and an altitude change of the drone 100. If it is recognized as the drone moves 1 m corresponding to the actual moving distance in 1 second, the controller 124 can recognize the current speed of the drone as 1 m/sec.

The controller 124 can recognize a moving speed of the specific object using at least one of the recognized current speed, the recognized flying path of the drone, and a video including the specific object captured via the camera 130. First of all, if it is recognized as the specific object 400 included in the video is located at a first location at a first time (FIG. 24 (*b*)) and the specific object moves to a second location at a second time (FIG. 24 (*b*)), the controller 124 can recognize a moving speed of the specific object 400 which has moved in the video. An algorithm for recognizing the moving speed of the specific object included in the video can be stored in the memory 122 in advance.

For example, if the specific object moves to the second location (refer to FIG. 24 (*c*)) from the first location (refer to FIG. 24 (*b*)) in the video, the controller 124 can recognize it as the specific object has moved 3 m. If it is recognized as time taken for the specific object to move 3 m corresponds to 1 second, the controller 124 can recognize the moving speed of the specific object as 3 m/sec in the video.

The controller 124 recognizes a direction to which the specific object moves using the video and can recognize whether or not the moving direction of the drone 100 corresponds to the recognized direction. If it is recognized as the flying path of the drone 100 corresponds to an opposite direction of the recognized direction, the controller 124 an recognize a value, which is resulted from subtracting a small value from a big value among the recognized current speed of the drone 100 and the speed of the specific object obtained from the video, as the speed of the specific object.

For example, when the specific object 400 included in the video moves to the second location (FIG. 23 (*b*)) from the first location (FIG. 23 (*b*)), if it is recognized as the opposite direction of the moving direction of the specific object corresponds to the moving direction of the drone 100, the controller 124 subtracts the current speed of the drone (1 m/sec) from the moving speed of the specific object (3 m/sec) recognized from the video. In particular, the controller 124 can recognize 2 m/sec as the speed of the specific object. Consequently, the controller 124 can recognize the speed of the specific object using at least one of the current speed of the drone, the flying path of the drone, and the video captured by the camera 130.

FIG. 25 is a diagram illustrating a further different example of a method of recognizing a speed of a specific object in a drone according to one embodiment of the present invention. In relation to FIG. 25, explanation on contents overlapped with the contents mentioned earlier in FIGS. 1 to 24 is omitted. A difference is mainly explained in the following. In FIG. 25, for clarity, assume that the drone 100 captures the specific object while flying at the side of the specific object in a direction identical to a direction of the specific object with a speed identical to the speed of the specific object.

The controller 124 can recognize a current speed of the drone 100 and a flying path of the drone 100. In this instance, the current speed of the drone may correspond to a speed calculated based on a distance which is changed in consideration of an altitude change of the drone, a planar location change of the drone, and the like. The moving path of the drone 100 can be determined based on a flying altitude of the drone and a moving direction of the drone 100.

For example, referring to FIG. 25 (a), the controller 124 can recognize an actual moving distance of the drone 100 using a planar moving distance of the drone 100 and an altitude change of the drone 100. If it is recognized as the drone moves 2 m corresponding to the actual moving distance in 1 second, the controller 124 can recognize the current speed of the drone as 2 m/sec.

The controller 124 can recognize a moving speed of the specific object using at least one of the recognized current speed, the recognized flying path of the drone, and a video including the specific object captured via the camera 130. First of all, if it is recognized as the specific object 400 included in the video moves to the second location (FIG. 25 (b)) from the first location (FIG. 25 (b)), the controller 124 can recognize the moving speed of the specific object 400, which has moved in the video. An algorithm for recognizing the moving speed of the specific object included in the video can be stored in the memory 122 in advance. For example, if it is recognized as the specific object included in the video is located at a first location at a first time (refer to FIG. 25 (b)) and the specific object is located at the first location at a second time (refer to FIG. 25 (c)), the controller 124 can recognize the moving of the specific object as 0 m/sec in the video.

The controller 124 recognizes a direction to which the specific object moves using the video and can recognize whether or not the moving path of the drone 100 corresponds to the recognized direction. If the moving speed of the specific object corresponds to 0 m/sec in the video and the moving direction of the drone corresponds to the moving direction of the specific object, the controller 124 can recognize the moving speed of the drone 100 as the moving speed of the specific object. Consequently, the controller 124 can recognize the speed of the specific object using at least one of the current speed of the drone, the flying path of the drone, and the video captured by the camera 130.

Method of Changing Capturing Composition of Specific Object Based on Speed of Specific Object In FIGS. 23 to 25, a method of recognizing a speed of a specific object has been explained. A method of changing a capturing composition based on the recognized speed is explained in the following with reference to FIG. 26. FIG. 26 is a diagram illustrating an example of a method of changing a capturing composition of a specific object based on a speed of the specific object in a drone according to one embodiment of the present invention.

According to one embodiment of the present invention, the controller 124 recognizes a speed of a specific object, changes a capturing composition of the specific object based on the recognized speed, and can capture the specific object based on the changed capturing composition.

As an example, if the speed of the specific object corresponds to a first speed, the controller 124 can change a capturing composition into a first capturing composition for capturing the entire body of the specific object 400 at the back of the specific object 400. In this instance, referring to FIG. 26 (a), the controller 124 can control the flying unit 110 to make the drone 100 maintain a location apart from the specific object 400 as much as a predetermined distance (a) and a predetermined altitude (h) and fly in a direction corresponding to a moving direction of the specific object 400 with a speed corresponding to the moving speed of the specific object at the back of the specific object. And, in order to continuously capture the specific object 400, the controller 124 can change a capturing angle of the camera 130 by controlling a movement of the camera 130.

As a different example, if the speed of the specific object corresponds to a second speed, the controller 124 can change a capturing composition into a second capturing composition for capturing the entire body of the specific object 400 while flying around over the specific object. In this instance, referring to FIG. 26 (b), the controller 124 can control the flying unit 110 to make the drone 100 maintain a location apart from the specific object 400 as much as a predetermined distance (a) and a predetermined altitude (h) and fly around over the specific object. The controller 124 can control a movement of the camera 130 to make the camera 130 continuously capture the specific object 400 although a position of the drone 100 is changed.

In relation to the present invention, the first capturing composition and the second capturing composition are not restricted by the aforementioned contents. It can have various capturing compositions and an optimized capturing composition appropriate for each speed can be stored in the memory 121.

A drone and a method for controlling the same according to an embodiment of the present invention provide the following advantages. For example, a drone can capture a video while automatically changing a capturing composition in consideration of a movement change of a subject and a status change of the subject.

A user of a mobile terminal can be captured in various compositions in consideration of various situations of the user of the mobile terminal without a separate person that controls a drone. Further, a drone can capture a specific object by autonomously changing a capturing composition based on a speed of the specific object.

In addition, a drone can capture a video while automatically changing a capturing composition by recognizing a movement change of a subject and a status change of the subject. Also, a drone can capture a user of a mobile terminal with various compositions in consideration of various situations of the user of the mobile terminal without a separate person for controlling the drone.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 124 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A drone, comprising:
a flying unit configured to generate a lift force for flying;
a camera configured to capture a specific object;
a communication unit configured to receive sensing data from a mobile terminal, wherein the received sensing data is data that the mobile terminal senses with respect to a status change of the specific object;
a memory configured to store capturing compositions of the specific object corresponding to a status of the specific object; and
a controller configured to:
recognize the status change of the specific object based on the received sensing data,
change a capturing composition of the specific object to the stored capturing composition in the memory corresponding to the recognized status change,
capture the specific object via the camera based on the changed capturing composition,
recognize the status change of the specific object based on at least one of information on a pulse of the specific object, information on a respiration of the specific object, information on a body temperature of the specific object, and information on an amount of perspiration of the specific object contained in the sensing data determine at least one of a capturing angle of the specific object and a capturing location of the specific object based on the changed capturing composition, control the flying unit to fly according to the determined at least one of the capturing angle of the specific object and the capturing location of the specific object, move the camera based on the determined at least one of the capturing angle of the specific object and the capturing location of the specific object, change the capturing composition of the specific object based on an extent of the status change of the specific object, and control the communication unit to transmit a captured video to the mobile terminal.

2. A method of controlling a drone, the method comprising:
generating, via a flying unit of the drone, a lift force for flying;
capturing, via a camera of the drone, a specific object;
receiving, via a communication unit of the drone, sensing data from a mobile terminal, wherein the received sensing data is data that the mobile terminal senses with respect to a status change of the specific object;
recognizing, via a controller of the drone, the status change of the specific object based on the received sensing data, wherein the sensing data is related with at least one of information on a pulse of the specific object, information on a respiration of the specific object, information on a body temperature of the specific object, and information on an amount of perspiration of the specific object;
changing, via the controller, a capturing composition of the specific object corresponding to the recognized status change, wherein the changed capturing composition corresponding to the status of the specific object is stored in a memory of the drone;
capturing, via the camera, the specific object based on the changed capturing composition determining, via the controller, at least one of a capturing angle of the specific object and a capturing location of the specific object based on the changed capturing composition; controlling, via the controller, the flying unit to fly according to the determined at least one of the capturing angle of the specific object and the capturing location of the specific object; moving the camera based on the determined at least one of the capturing angle of the specific object and the capturing location of the specific object; changing, via the controller, the capturing composition of the specific object based on an extent of the status change of the specific object, and controlling the communication unit to transmit a captured video to the mobile terminal.

3. A drone, comprising:
a flying unit configured to generate a lift force for flying;
a camera configured to capture a specific object;
a communication unit configured to transmit a video captured by the camera to a mobile terminal;
a memory configured to store capturing compositions of the specific object corresponding to a speed of the specific object; and
a controller configured to:
obtain a signal for capturing the specific object in a specific capturing mode from the mobile terminal,
recognize a current speed of the drone and a flying path of the drone,
recognize the speed of the specific object using the current speed of the drone, the flying path of the drone, and the video captured by the camera,
change a capturing composition of the specific object to the stored capturing composition in the memory, corresponding to the recognized speed,
capture the specific object based on the changed capturing composition determine at least one of a capturing angle of the specific object and a capturing location of the specific object based on the changed capturing composition, control the flying unit to fly according to at least one of the determined capturing angle of the specific object and the capturing location of the specific object, move the camera based on at least one of the determined capturing angle of the specific object and the capturing location of the specific object, and control the communication unit to transmit the video captured based on the changed capturing composition to the mobile terminal.

4. A method of controlling a drone, the method comprising:
generating, via a flying unit of the drone, a lift force for flying;
capturing, via a camera of the drone, a specific object;
transmitting, via a communication unit of the drone, a video captured by the camera to a mobile terminal;
obtaining a signal for capturing the specific object in a specific capturing mode from the mobile terminal;
recognizing, via a controller of the drone, a current speed of the drone and a flying path of the drone;
recognizing, via a controller of the drone, a speed of the specific object using the current speed of the drone, the flying path of the drone, and the video captured by the camera;
changing, via the controller, a capturing composition of the specific object corresponding to the recognized speed, wherein the changed capturing composition corresponding to the speed of the specific object is stored in a memory of the drone;

capturing, via the camera, the specific object based on the changed capturing composition determining, via the controller, at least one of a capturing angle of the specific object and a capturing location of the specific object based on the changed capturing composition; controlling, via the controller, the flying unit to fly according to at least one of the determined capturing angle of the specific object and the capturing location of the specific object; moving the camera based on at least one of the determined capturing angle of the specific object and the capturing location of the specific object; and controlling the communication unit to transmit the video captured based on the changed capturing composition to the mobile terminal.

\* \* \* \* \*